United States Patent [19]
Sutherland et al.

[11] Patent Number: 6,167,442
[45] Date of Patent: Dec. 26, 2000

[54] METHOD AND SYSTEM FOR ACCESSING AND OF RENDERING AN IMAGE FOR TRANSMISSION OVER A NETWORK

[75] Inventors: Stephen B. Sutherland, Unionville; Dale M. Wick, Brooklin; John Paul J. Gignac, LaSalle; Sasa Radulovic, North York, all of Canada

[73] Assignee: Truespectra Inc., North York

[21] Appl. No.: 09/023,412

[22] Filed: Feb. 13, 1998

[30] Foreign Application Priority Data

Feb. 18, 1997 [CA] Canada .................................. 2197822
Jul. 24, 1997 [CA] Canada .................................. 2211368

[51] Int. Cl.$^7$ ............................... G06F 15/16; G06F 9/00
[52] U.S. Cl. ......................... 709/217; 709/218; 709/303
[58] Field of Search ................................. 709/217, 303, 709/213, 216, 218, 219

[56] References Cited

FOREIGN PATENT DOCUMENTS

97/12486  4/1997  WIPO .............................. H04N 7/16

OTHER PUBLICATIONS

"Middleware!" Data Communications, vol. 21, No. 4, pp. 58–60, 62–64, 65–67, Mar. 1, 1992.

(List continued on next page.)

*Primary Examiner*—John W. Miller

[57] ABSTRACT

The present method renders scan lines of an image to an output device in a memory efficient manner and in a manner suitable for a client server application using an Internet or Intranet type network. The image is defined by a number of order objects, each of which is independently stored. The procedure determines on a scan line basis the objects which influence the particular scan line and accumulates the rendering effect of the objects necessary for returning the scan line. Returned scan lines are transmitted over a network to a client computer and the procedure is repeated. Objects are only partially rendered as required to pass on the necessary information as input for the next object. This approach maintains the independence of the objects, allows interaction of objects, allows output to high resolution output devices in a memory efficient manner, and allows each object to be reproduced at the best resolution and in an efficient manner for a large scale network application. The present invention is directed to a system for accessing, modifying, and transporting images over a computer network. The system has at least one client computer and at least one server computer which exchange data and control signals therebetween over a network, the network using one network middleware of a series of network middleware. The system further includes a plurality of image databases which use different programs for storing, managing and accessing the stored images. Each image database includes a predetermined image standard for transferring a stored image and includes predetermined standard control signals for accessing and processing selected images. The client computer includes application software with the capability to communicate with any of the image databases using standard predetermined control signals and the capability of receiving images using the predetermined standard for transferring an image. The client computer and server computer uses a proxy-stub arrangement for compensating for different middleware. Image manipulations, transfer and receipt occurs based on the predetermined standard for transferring and image and the predetermined control signals.

16 Claims, 21 Drawing Sheets

OTHER PUBLICATIONS

Fox et al: "Reducing WWW Latency and Bandwidth Requirements by Real–Time Distillation" Computer Networks and ISDN Systems, vol. 28, No. 11 pp. 1445–1456, May 1996.

Chen L. T. et al.; "Reflective Object–Oriented Distributed System for Heterogeneous Multimedia Environments" Computer Communications, vol. 19, No. 8, pp. 698–706, Jul. 1996.

"Middleware!" Data Communications, vol. 21, No. 4, Mar. 1, 1992, pp. 58–60, 62–64, 65–67, OPOOO262775 * p. 59, left–hand column; p. 62; p. 64 middle column*.

Blair G Et Al: "Standards and Platforms for Open Distributed Processing" Electronics and Communication Engineering Journal, vol. 8, No. 3, Jun. 1, 1996, pp. 123–133, OPOOO592210 * summary; paragraph 2 *.

Fox Et Al: "Reducing WWW latency and bandwidth requirements by real–time distillation" Computer Networks and ISDN Systems, vol. 28, No. 11, May 1996, pp. 1445–1456 XPOO4018241 * paragraphs 1–3 *.

Comerford R: "Software Engineering" IEEE Spectrum, vol. 34, No. 1, Jan. 1997, pp. 65–69, XPOOO691711 * p. 66 *.

Chen L T Et Al: "Reflective object–oriented distributed system for heterogeneous multimedia environments" Computer Communications, vol. 19, No. 8, Jul. 1996, pp. 698–706 XPOO4052757 * abstract *.

Schill A B Et Al: "Client/Server Approach Versus Distributed Object–Oriented Computing on Top of OSF DCE" Computer Communications, vol. 18, No. 7, Jul. 1995, pp. 512–518, XPOOO513482 * abstract *.

Fig. 7

```
This procedure initializes rendering of an image that consists of
the objects in the given list, rendered into an image of the given
resolution.  this procedure should be used in conjunction with
Render-Stage and Render-Term

Inputs:
- OBJ-LIST is the list of objects that define the picture.  Their
positions are specified in world space.  They are sorted either from
deepest to shallowest or vice versa.
- OUTPUT-RESOLUTION is the resolution of the target image
- WORLD-TO-OUTPUT is a transformation from world space to the output
box.  The output box is clearly defined in the first four lines of
the procedure.  This parameter is most likely in the form of an
affine transformation matrix.

Outputs:
- HANDLE is a handle to be passed to Render-Stage and Render-Term
- INPUT-BOX is an extended version of the output box that includes
any extra required information that is beyond the edges of the
output image.  This is necessary because lookaround objects can
sometimes pull information from outside the bounds of the image
onto the image.

Proc Render-Init(OBJ-LIST, OUTPUT-RESOLUTION, WORLD-TO-OUTPUT)

OUTPUT-BOX.top <-- 0
    OUTPUT-BOX.left <-- 0
    OUTPUT-BOX.bottom <-- OUTPUT-RESOLUTION.height - 1
    OUTPUT-BOX.right <-- OUTPUT-RESOLUTION.width - 1

INPUT-BOX <-- OUTPUT-BOX

Initialize the list of objects to render
    RENDER-LIST <-- empty list

For each OBJ in OBJ-LIST (shallowest to deepest)

Calculate the object's position in output coordinates
            ## The MergeTransforms procedure concatenates the two input
            ## transforms.  OBJ.position is a mapping from object
            ## coordinates to world coordinates.  The result is a mapping
            ## from object coordinates to output coordinates.
        OBJ-TO-OUTPUT <-- MergeTransforms(WORLD-TO-OUTPUT, OBJ.position)

Calculate the object's boundbox
        BOUNDBOX <-- Calculate-BoundBox(OBJ, OBJ-TO-OUTPUT)

Clip the boundbox to the input box
            BOUNDBOX <-- ClipRectangle(BOUNDBOX, INPUT-BOX)

Make sure the object is partially visible
        If BOUNDBOX is empty, Goto next_obj REGN-LOOKAROUND <-- OBJ.region.Lookaround-Distance()
        TOOL-LOOKAROUND <-- OBJ.tool.Lookaround-Distance()
        NODE.Y <-- BOUNDBOX.top
```

Fig. 7 (cont'd)

```
    ## Calculate the object lookaround as the maximum of the two
    LOOKAROUND.left   <-- Max(REGN-LOOKAROUND.left,  TOOL-LOOKAROUND.left)
    LOOKAROUND.down   <-- Max(REGN-LOOKAROUND.down,  TOOL-LOOKAROUND.down)
    LOOKAROUND.right  <-- Max(REGN-LOOKAROUND.right, TOOL-LOOKAROUND.right)
    LOOKAROUND.up     <-- Max(REGN-LOOKAROUND.up,    TOOL-LOOKAROUND.up)

Insert this object's information into the render list
    NODE <-- (OBJ, OBJ-TO-OUTPUT, BOUNDBOX, LOOKAROUND)
    Insert-Node(RENDER-LIST, NODE)

If the object reaches off the edges of the current input-box,
    ## extend the input box appropriately.
    If BOUNDBOX.left - LOOKAROUND.left < INPUT-BOX.left Then
        INPUT-BOX.left <-- BOUNDBOX.left - LOOKAROUND.left
    If BOUNDBOX.right + LOOKAROUND.right > INPUT-BOX.right Then
        INPUT-BOX.right <-- BOUNDBOX.right + LOOKAROUND.right
    If BOUNDBOX.top - LOOKAROUND.up < INPUT-BOX.top Then
        INPUT-BOX.top <-- BOUNDBOX.top - LOOKAROUND.up
    If BOUNDBOX.bot + LOOKAROUND.down > INPUT-BOX.bot Then
        INPUT-BOX.bot <-- BOUNDBOX.bot + LOOKAROUND.down next_obj:
    EndFor NEXT-INPUT-SCANLINE <-- INPUT-BOX.top

HANDLE <-- (NEXT-INPUT-SCANLINE, RENDER-LIST)

Return the handle and the required range of input scanlines
    Return (HANDLE, INPUT-BOX)
EndProc
```

Fig. 8

```
This procedure executes a single stage it should be called once for
each input scanline.  That is, if INPUT-BOX is the box returned by
Render-Init, then there are to be INPUT-BOX.height stages.

Note that only OUTPUT-RESOLUTION.height scanlines will be returned.
There is no guarantee that they will be returned with any sort of
regularity.  Any number of scanlines may be returned at the end of
any stage.

Inputs:
- HANDLE is the handle returned by Render-Init.
- INPUT-SCANLINE is the next scanline of the background image
onto that rendering should occur.  This scanline is usually
blank.

Outputs:
- Y is the number of the most recently completed scanline.  Here,
0 is the topmost scanline of the output image.

Proc Render-Stage(HANDLE, INPUT-SCANLINE)

Y <-- NEXT-INPUT-SCANLINE
    NEXT-INPUT-SCANLINE <-- NEXT-INPUT-SCANLINE - 1

Store the input scanline for easy reference
    HANDLE.scanline(Y) <-- BUFFER For each NODE in HANDLE.render-list (deepest to shallowest)

What is the top scanline that this object inspects?
        ABOVE <-- NODE.boundbox.top - NODE.lookaround.up

If we haven't yet reached the object, skip it
        If Y < ABOVE, Goto next_obj

Calculate how many scanlines this object can now render.
        ## The scanlines that can be rendered immediately are numbered
        ## from Y to DOWNTO.
        If Y >= NODE.boundbox.top &
            Y < NODE.boundbox.bottom + NODE.lookaround.down Then

The object is currently stalled

If Y < NODE.boundbox.top + NODE.lookaround.down Then
                ## It is still waiting for lookahead scanlines
                DOWNTO <-- NODE.boundbox.top - 1
            Else
                ## It can render one scanline
                DOWNTO <-- Y - NODE.lookaround.down
            EndIf
        Else
            ## There is no stall
            DOWNTO <-- Y
        EndIf
```

Fig. 8 (cont'd)

```
        ## Render this object's scanlines numbered from Y through DOWNTO
                ## This is as many scanlines as the object can possibly render
                ## until the next stage.
        For N from NODE.Y to DOWNTO

Buffer the current scanline
            Copy-Scanline(NODE.buffer(N), HANDLE.scanline(N))

If we're on the object's first scanline, initialize
            ## the region and tool
            If N = NODE.boundbox.top Then OBJECT-SIZE = NODE.boundbox.size NODE.region.Init(OBJECT-SIZE, NODE.obj-to-output)
                NODE.tool.Init(OBJECT-SIZE, NODE.obj-to-output)
            EndIf

Render a scanline of the region into a temporary buffer
            TEMP_BUF <-- NODE.region.Scanline(NODE.buffers, HANDLE.scanlines)

Render a scanline of the tool using the region's output
            ## as a translucency filter.  The result is stored in
            ## HANDLE.scanline(N)
            NODE.tool.Scanline(NODE.buffers, HANDLE.scanlines, TEMP_BUF)

If we're on the last scanline, terminate the region and
            ## tool and remove the node from the render list
            If N = NODE.boundbox.bot Then NODE.tool.Terminate()
                NODE.region.Terminate()

Remove-Node(HANDLE.render-list, NODE)
            EndIf
        EndFor
        NODE.Y <-- DOWNTO+1
        Y <-- DOWNTO
next_obj:
    EndFor

Return the number of the bottom-most completed scanline
    Return Y
EndProc
```

Fig. 9

```
This procedure marks the end of rendering.  It should be called after
the entire image has been rendered.

Inputs:
- HANDLE is the handle returned by Render-Init.

Outputs:
none

Proc RenderTerm(HANDLE)
    Free all allocated resources
EndProc
```

Fig. 10

```
Using the Render Engine
This procedure is a demonstration of how the Render-Init, Render-Stage
and Render-Term functions are used.

Inputs:
- OBJ-LIST, OUTPUT-RESOLUTION, WORLD-TO-OUTPUT are the same as in
Render-Init.
- DEVICE is the device to send the output image to.  Ideally, it
is a scanline-based device like a printer or a monitor.  It can
also be a logical device like a pipe or a redirection.
Proc Render-Image(OBJ-LIST, OUTPUT-RESOLUTION, WORLD-TO-OUTPUT, DEVICE)

Initialize the engine
    (HANDLE, INPUT-BOX) <--
        Render-Init(OBJ-LIST, OUTPUT-RESOLUTION, WORLD-TO-OUTPUT)

We need to provide scanlines numbered from INPUT-BOX.top
    ## through INPUT-BOX.bottom.
        TOP <-- INPUT-BOX.top
        BOTTOM <-- INPUT-BOX.bottom

P represents the next scanline to send to the output device
    P <-- 0

For Y from TOP to BOTTOM
        ## Create a new blank scanline with the appropriate width
        SCANLINE(Y) <-- new scanline(INPUT-BOX.width)

DOWNTO <-- Render-Stage(HANDLE, SCANLINE(Y))

Send any new scanlines to the output device
        For N from P to DOWNTO
            Output(DEVICE, SCANLINE(N))
        EndFor
            P <-- DOWNTO + 1
        EndFor
    EndFor

Clean up
        Render-Term( HANDLE)

EndProc
```

FIGURE 15

ImageSource Interfaces Specification

////////////////////////////////////////////////////////////////
// ColorSpace and CompressionInfo

```
class ColorSpace
{
public:
 virtual BOOL isCalibrated()=0;
 virtual BOOL isAlphaPremultiplied()=0;
 virtual int getType()=0;
 virtual int getPlaneCount()=0;
 virtual int getPlaneType(int plane)=0;
};

typedef enum {
   compressionNone = 0
   compressionSingleColor = 1;
   compressionJPEG = 2,
} CompressionType;

class CompressionalTable
{
public:
 virtual int getDataLength()=);
 virtual void getData(byte* data)=0;
 virtual void getType();
 virtual void compress(byte* inData, int inLenth,
                byte* outData, int* outLength)=0;
 virtual void decomress(byte* inData, int inLength,
                byte* outData, int* outLength)=0;
};

class CompressionInfo
{
public:
 virtual int getTableCount()=0;
 virtual CompressionTable* getTable(int index)=0;
};
```
////////////////////////////////////////////////////////////////
// ImageSource

```
class ImageSource
{
public:
virtual int getResCount()=0;

// Image size in tiles and pixels
virtual void getTileCount(int resLevel, SIZE* size)=0;
virtual void getPixelSize(int resLevel, SIZE* size)=0;
```

Fig. 15 (cont'd)

```
// Region of interest
virtual void setRegionOfInterest(int resLevel, const RECT*
rectROI)=0;

// Compression and colorspace information
virtual CompressionInfo getCompressionInfo()=0;
virtual Colorspace getColorSpace(int resLevel)=o;

// Tile access
virtual void getRawTile(int resLevel, int tileNum,
            byte* buffer, dword* length,
            dword* cmpType, dword* cmpSubtype)=0 virtual void getTile(int resLevel, int tileNum,
            byte* buffer, dword* length)=0;
};
///////////////////////////////////////////////////////////////
// ImageSourceModule class ImageSourceModule
{
public:
 virtual float getVersion()=0;
 virtual dword getVendor()=0;
 virtual dword getCapabilites()=0;
 virtual const char* getClassID()=0;
 virtual ImageSource* load(const char* pszFileName)=0;
};

///////////////////////////////////////////////////////////////
// ImageSourceRegistry class ImageSourceRegistry
{
public:
 virtual void registerImageSourceModule(const char* classID)=0;
 virtual void unregisterImageSourceModule(const char* classID)=0;
 virtual ImageSourceModule*
            getImageSourceModuleFromClassID(const char* classID)=0
 virtual ImageSourceModule*
            getImageSourceModuleFromName(const char* fileName)=0;
 virtual ImageSourceModule* getIIPImageSourceModule()=0;
 virtual ImageSource* loadImageSource(const char* fileName)=0;
};
```

METHOD AND SYSTEM FOR ACCESSING AND OF RENDERING AN IMAGE FOR TRANSMISSION OVER A NETWORK

FIELD OF THE INVENTION

The present invention relates to a method for defining various objects which make up an image and a method of rendering the image supporting object interaction. This invention is particularly useful for a server rendering scan lines of an image to a client having an output device where a network connects the server to the client. The present invention also relates to a system for image accessing and in particular to a system for accessing images across a network.

BACKGROUND OF THE INVENTION

The Internet, and its subordinate the Intranet, in its capacity as a client server network has, in recent years, become a major source of information for many people worldwide. With this increased usage of the Internet as a source of information has come an increased desire for access to more and varied information. The Internet entails many different services, however, the World Wide Web (the Web) has become associated with many users as the primary usage of the Internet. While the Web is increasingly becoming the main service being used, there are limitations to the accessing of information due in part to the protocols commonly employed and the capability of the protocol to pass information in various forms. For example, HyperText Transport Protocol (HTTP), the major data exchange protocol employed on the Web, works well for transport of HyperText Markup Language (HTML) documents or files which include text and multimedia components by browsers which support the protocol. However, it is difficult to pass dynamic data back and forth between the client and server. This is particularly true if one wanted to utilize the Internet for access to various databases of information with the information being used by other applications or programs on a client computer.

Images in particular present problems if the intent is to use the image in applications or programs other than a browser program. Currently picture images are displayed over the Internet on a web page as low resolution bitmaps and have an acceptable appearance on the screen because of the low (72 dpi) resolution of the display screen. These bitmap images can be printed locally by the client with reasonable, but less than photographic quality, on today's ink jet printers. There are many different image formats in use and if a program wishes to view or use an image, support for each of the image formats must be coded into the program. Each time a programmer wishes to access and use an image in an application, the resources for doing so must be coded in the application. In addition if the images are being accessed over a network, resources for the network protocol may also have to be provided. Presently, there is only one protocol defined to allow access of images over the Internet, namely, the Internet Image Protocol, or IIP. IIP has deficiencies in that it can only work through MTTP support networks. as such, applictions using network access for images must provide MTTP procedure calls as well as be able to process individual image file formats. It would be much simpler if the image accessing were standardized through a standard which also allows for platform, and transport independence such that a programmer could provide access to all image types or all platforms over any transport protocol by merely coding access to the common standard.

There are a number of computer graphic programs which store various objects and use these objects to render the final image. Generally, these computer programs can be divided into vector based graphic programs or bitmap based programs. COREL DRAW™ is primarily vector based whereas PHOTOSHOP™ is essentially bitmap based. These known graphic packages allocate enough temporary storage for the entire rendered image and then render each object, one by one, into that temporary storage. This approach fully renders lower objects prior to rendering upper objects. The programs require substantial memory in rendering the final image. Some programs use layers to allow flexibility in changing the final image, however, each layer is effectively a duplicate bitmap the size of the original base bitmap. Layers add flexibility in changing the design or returning to an earlier design, but substantial additional memory is required.

The final image of graphic packages is typically sent to a raster device for output, which renders the image on a scan line by scan line basis. The final image is defined by a host of scan lines, each representing one row of the bitmap image. Raster devices include printers, computer screens, television screens, etc.

Vector based graphic programs, such as COREL DRAW™, produce a bitmap of the final image for the raster device. Similarly, the graphic program PHOTOSHOP™ produces a bitmap of the final image.

Vector based drawings tend to use little storage before rendering, as simple descriptions often produce largely significant results. Vector drawings are usually resolution independent and they are typically made up of a list of objects, described by a programming language or by some other symbolic representation. Bitmap images, in contrast, are a rectangular array of pixels wherein each pixel has an associated colour or grey level. This type of image has a clearly defined resolution (the size of the array). Each horizontal row of pixels of the bitmap is called a scan line. Bitmaps tend to use a great deal of storage, but they are easy to work with because they have few properties.

The problems associated with rendering an image and the memory requirements are further complicated where the image is being transmitted over a network such as Internet or an Intranet network. The time required to transmit an image, particularly a high quality image for reproduction on a printer, is excessive and the demands on the memory of the personal computer are also high.

Currently picture images are displayed over the Internet on a web page as low resolution bitmaps and have an acceptable appearance on the screen because of the low (72 dpi) resolution of the display screen. These bitmap images can be printed locally by the client with reasonable, but less than photographic results, on today's ink jet printers.

With some current technology, these low resolution bitmaps can be "upgraded" on printing to a higher resolution. If rendered at 150 dpi, there is an improvement in quality, but the network transmission time is roughly four times longer and the quality is still not "near photographic".

There are several other problems with this approach:
1. The image content is rendered statically and cannot be modified by the user.
2. The entire image must be transmitted before printing can start.
3. The data is transmitted as a 24-bit image.
4. As the images are prerendered, colour correction for the user's printer cannot be applied to give the best quality of images.

An image rendered at 72 dpi on the screen and printed at 720 dpi is typically what is done by today's Internet browser applications (such as Netscape and Internet Explorer) on a typical home ink jet printer. This results in a poor quality print image, but is improved somewhat by substituting a pre-made higher resolution image at print time. The same image rendered at 360 or 720 dpi provides a dramatically more satisfying "near photographic" quality output, but the time and resources required to do this strain most personal computers using conventional techniques.

For instance, a full page requires:

| Print Requirements | 360 dpi | 720 dpi |
|---|---|---|
| File Size | 32 Mb | 129 Mb |
| Transmission Time | 3+ hours | 6+ hours |
| Memory Requirements | 32 Mb–64 Mb | 128 Mb–256 Mb |
| Hard Disk Requirements | 32 Mb–64 Mb | 128 Mb–256 Mb |
| Print Time | 5–30 min. | 10–60 min. |

In many cases, the client simply does not have the resources to store these high quality images before printing.

There remains a need to provide an improved method of defining an image and the interaction of its components as well as a better procedure for rendering an image to various output devices at various resolutions over a network.

SUMMARY OF THE INVENTION

The present invention is directed to a system for accessing, modifying, and transporting images over a computer network. The system comprises at least one client computer and at least one server computer which exchange data and control signals therebetween over a network, the network using one network middleware of a series of network middleware. The system further includes a plurality of image databases which use different programs for storing, managing and accessing the stored images. Each of said plurality image database includes a predetermined image standard for transferring a stored image and includes predetermined standard control signals for accessing and processing selected images. The client computer includes application software with the capability to communicate with any of the image databases using standard predetermined control signals and the capability of receiving images using the predetermined standard for transferring an image. The client computer and server computer uses a proxy-stub arrangement for compensating for different middleware. Image manipulations, transfer and receipt occurs based on the predetermined standard for transferring and image and the predetermined control signals.

In another aspect of the invention, there is provided a system for accessing image databases to retrieve images, the image databases being provided on at least one server, the databases storing images in one or more formats selected from JPEG, TIFF, GIF, FLASHPIX and other image file formats. Each server computer is connected to one or more client computers using a proxy-stub arrangement over a network which operates using middleware which can include HTTP, DCOM, CORBA, and RMI. The client computers operate using a program which communicates with other networked devices involved with image transfer using a predetermined image standard and control signals. Each of the server and the image database also use programs which communicate with other image transfer devices utilizing the predetermined mage standard and control signals. The image transfer is accomplished over the network by implementing the predetermined standard and control signals thereby allowing access and retrieval of images stored in a database without knowledge of applications used to store the image in the database.

BRIEF DESCRIPTION OF THE DRAWINGS

Preferred embodiments of the invention are shown in the drawings, wherein:

FIGS. 7 through 10 show pseudocode illustrating the steps performed in rendering an image to an output device;

FIG. 15 is a listing of pseudocode associated with the UII;

DETAILED DESCRIPTION OF THE PREFERRED EMBODIMENTS

Figure 11:
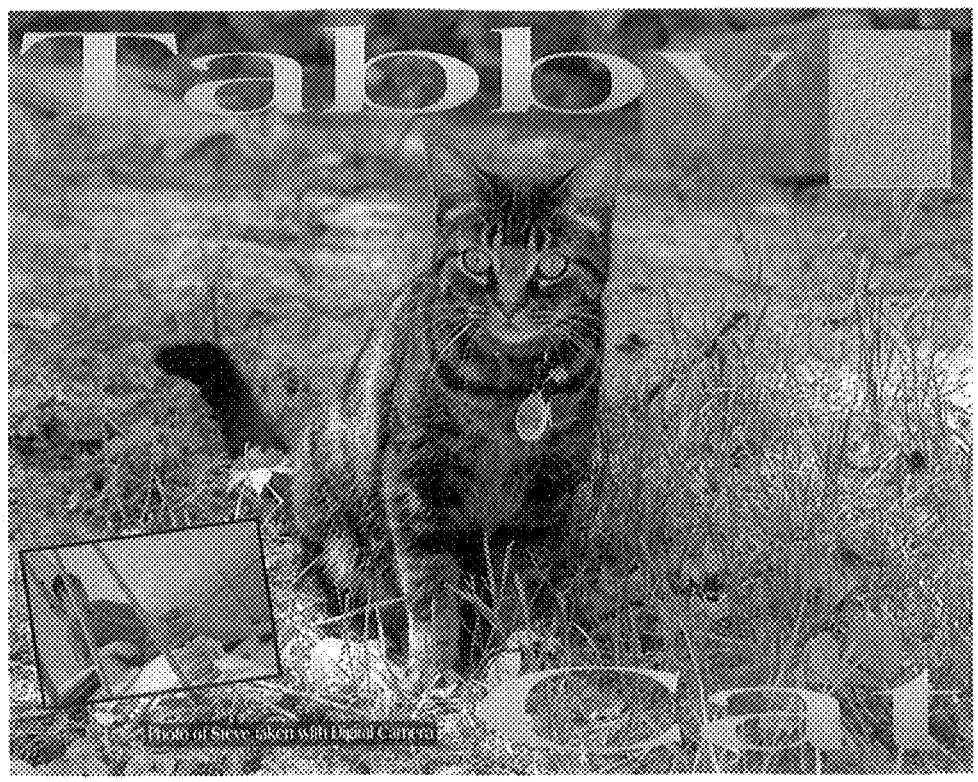
FIG. 11 is a photocopy of an image having a bitmap of a photograph of a cat defined as one object of the image.
Figure 12:
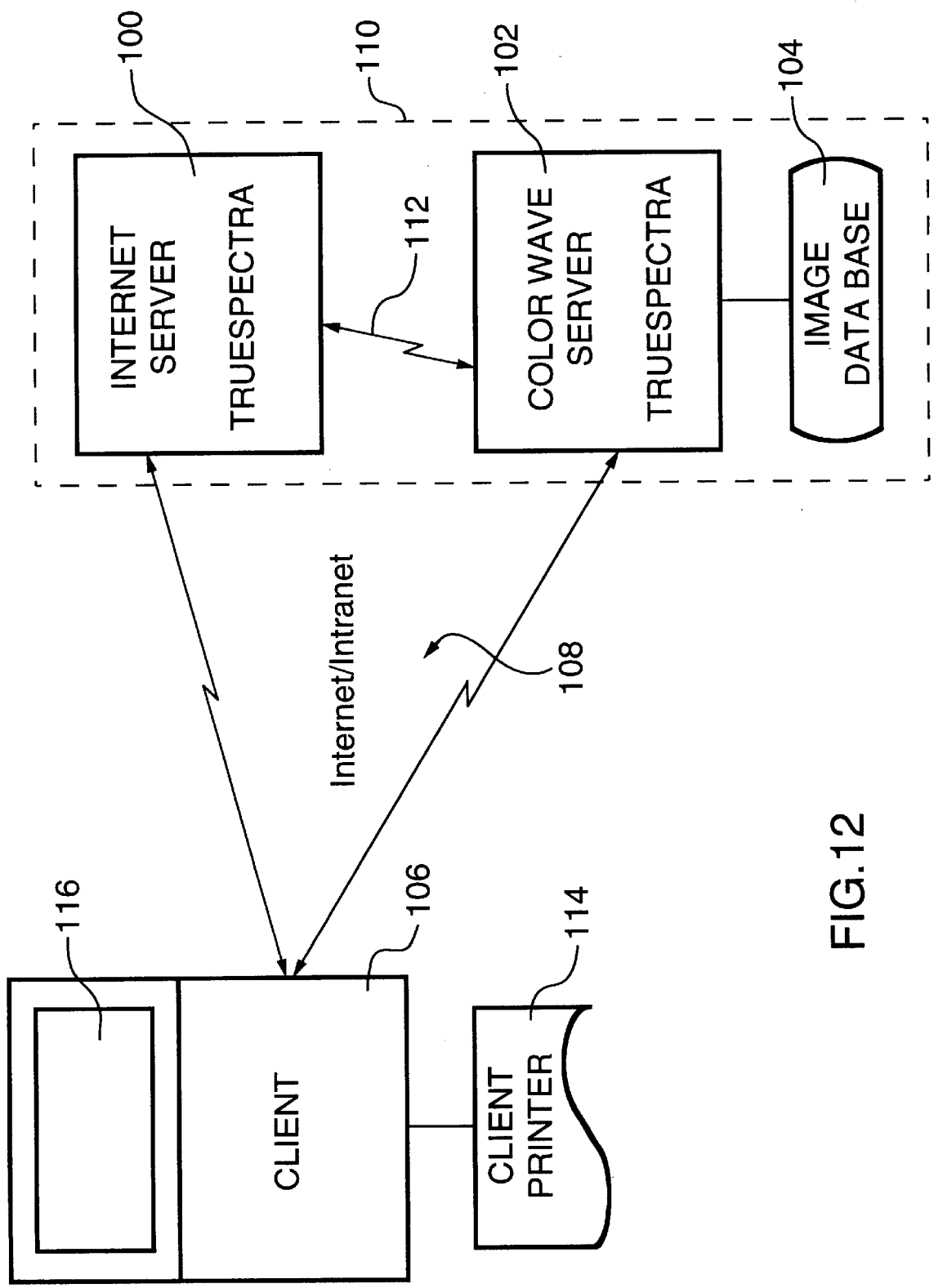
FIG. 12 is a schematic illustrating how a networked version of the method and apparatus is carried out.

The present invention will first be described with respect to a particular method for rendering an image on a scan line by scan line basis (FIGS. 1–11), followed by how this process can advantageously be used over a network between a server and a client (FIG. 12). In addition, a system and method for image accessing using a defined standard will also be described (FIGS. 13–19).

Figure 1:
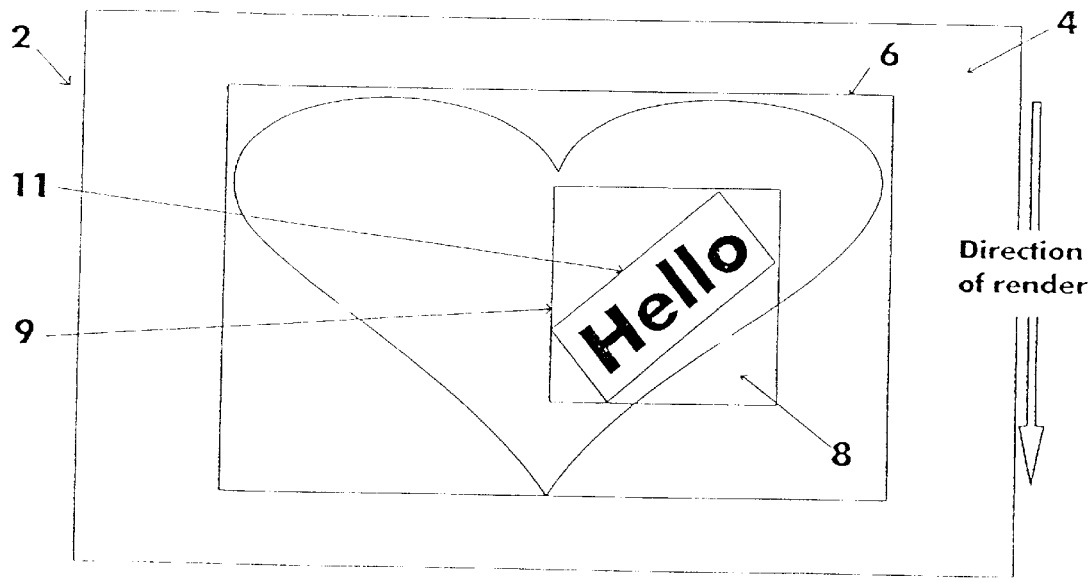
FIG. 1 is a depiction of a rendered simple image.

FIG. 1 shows an image 2, which is the collective rendering effect of the initial background 4, the lowest object 6 (heart), followed by the upper object 8 (greeting). The background 4 is easily defined and merely establishes the base to which the objects are applied. The background provides the input for the lowest object. Each of the objects 6 and 8 are separately defined and form part of the object list 10 shown in FIG. 3. The background provides initial input information used during rendering of the scan lines. This object list expands as additional objects are added and the objects are maintained in an order, based on their effect from a lowest object to an upper object. The upper object is the last object to be applied.

Figure 2:
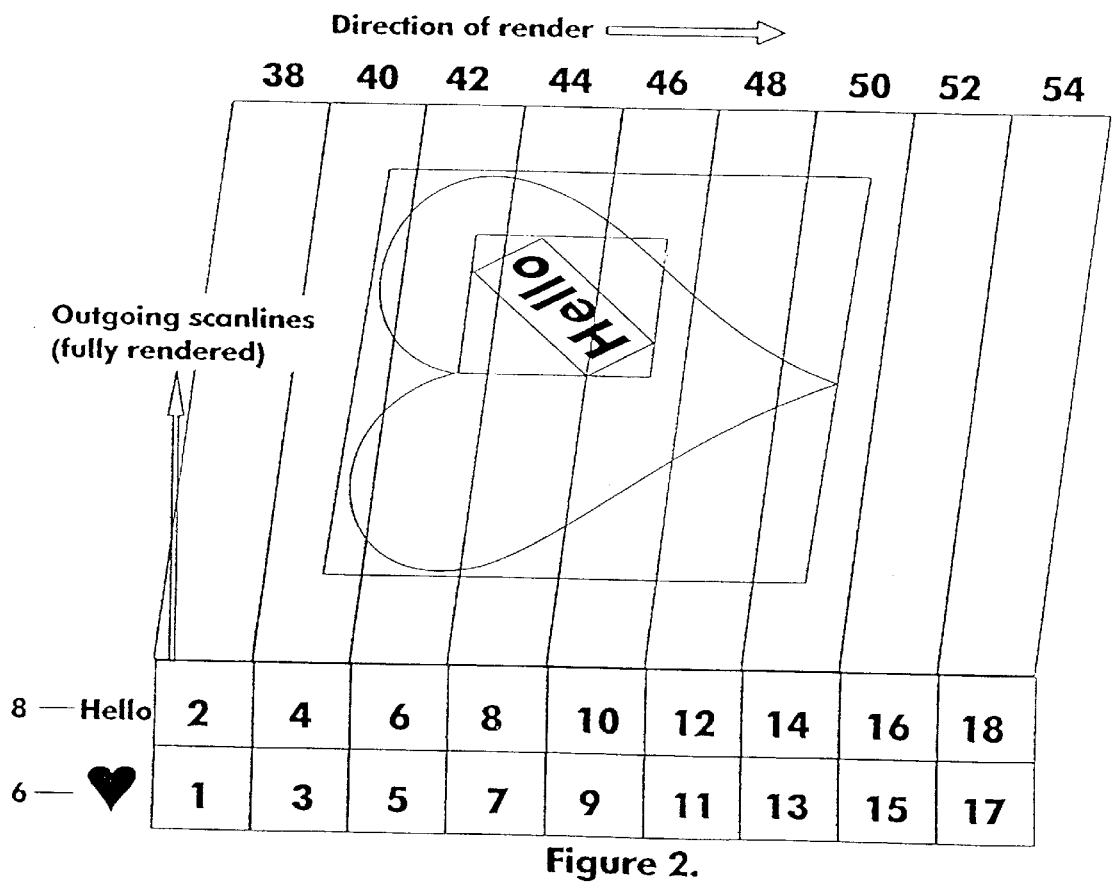
FIG. 2 is a depiction showing how various objects are used by a render engine to produce the scan lines making up the image of FIG. 1.
Figure 3:
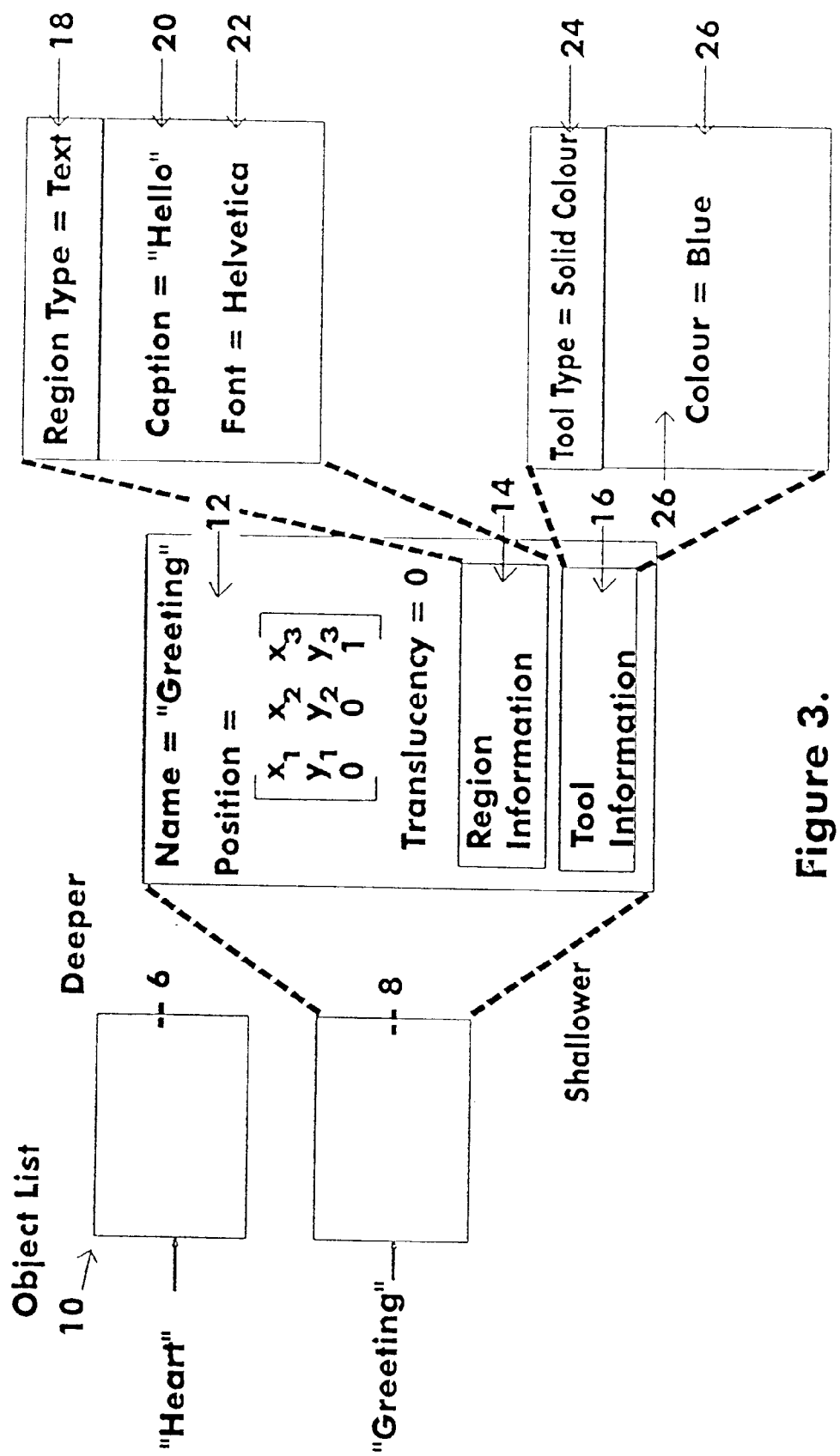
FIG. 3 illustrates the list of objects and how each object is defined.

Each of the objects shown in FIGS. 1 and 2 are defined in a manner to position the object in the final image and to allow the object to be used by a render engine to render scan lines of the image. As shown in FIG. 3, each of the objects is defined by means of general information 12, region information 14 and tool information 16. For object 8, general information 12 includes the label "Greeting" and various position coordinates as well as the degree of translucency specified for the overall object.

The region information for object 8 has been defined at 18 which specifies the actual text, "HELLO", indicated at 20, as well as the font indicated at 22.

The tool information 16 defines a tool type, in this case "solid colour" indicated at 24, as well as the specific colour "BLUE" indicated at 26.

Each of the objects have their own particular resolution determined at the time of entering or creating the object. In the case of object 8, the resolution is unlimited since the region information would be defined in terms of a series of arcs and the tool as a simple solid colour fill. The actual resolution of each object in the final image is dictated by the output device which produces the scan lines and the size of the object within the final image. The best resolution for each object is used.

Defining objects as regions and tools allows ease of expansion, as any new tool can be paired with any existing region and any new region can be paired with the existing tools.

There are three distinct coordinate systems which are used in the present method and procedures, namely world coordinates, object coordinates and output coordinates. World coordinates are the space in which object positions are specified. There is no fixed connection between world coordinates and, for instance, any particular output device coordinates. Object coordinates define a local coordinate system within each object and range from −1 to 1 in each dimension. Output coordinates are used to specify positions in the output image. They are usually measured in pixels relative to some corner of the image at output resolution and vary with different output devices.

As described above, each object consists of a region and a tool. Each object's position is represented by an affine transformation matrix which maps points from object coordinates into world coordinates. The effect of the object is restricted to the parallelogram which is the image of the object rectangle mapped into world coordinates. The object rectangle has an area which spans the object coordinates. In FIG. 1, rectangle 9 indicates the boundaries where object 3 can affect a scan line of the final image. The object rectangle 11 has been mapped into world coordinates. The scan lines of the final image affected by an object are determined at initialization of the procedure to simplify the decision process in determining whether a particular object affects a particular scan line about to be rendered.

The object region controls the affected area of th e overall image. The simplest region is the rectangle region. The text region is a particularly useful example. It allows any text string to be specified and restricts the tool's effect to the shape of the specified string.

Rectangle and text are both examples of regions which at any point of the rendering of the region are either completely opaque or completely transparent. Regions are more general than this, in that they may specify a translucency level for each point of the drawing. For example, in the case of an ellipse fade region, the tool would be completely opaque in the object's center, but become more translucent towards the edges of the object.

When an object is rendered, most of the work is performed by its region and tool. The region effectively renders a greyscale bitmap for the tool to examine. The tool then uses that image as a mask and renders its own effect directly onto the destination bitmap proportional to the density of the region, and adjusted for the translucency of the object. As will be more fully described, this is done on a scan line by scan line basis.

A bitmap, such as a digitized photograph, to be used to define an object, is stored in memory and used by a bitmap tool. The region for this object is normally the rectangle and the bitmap tool transforms the bitmap to fit the rectangle. The region need not be a rectangle, for example it could be heart-shaped, effectively clipping the bitmap to that shape. Bitmaps are processed through the bitmap tool.

FIGS. 1 and 3 have illustrated the concept that the image 2, comprises a background 4, the "heart" object 6 and "greeting" object 8. Each object is separately maintained as part of the internal list of objects 10 and each has its own required information which allows it to be rendered on a scan line by scan line basis and then to be positioned within the final image. The objects are ordered to define a relative depth within the image and the image will be rendered from the deepest object to the shallowest object. To render the image of FIG. 1, the objects are partially rendered in depth order and the engine actually renders any required portions of the objects effectively simultaneously in rendering a scan line. This process is repeated for each scan line. In most cases, the objects are only partially rendered to define a scan line of the final image.

Scan line ordering has the advantage that, typically, only a few scan lines of the destination image must be in memory at any particular moment. Whenever a scan line has been completely rendered, it can be immediately sent to the output device and then freed from storage.

The render engine operates in stages. Each stage consists of a loop through the object list from deepest to shallowest. For each object, the engine calculates the number of scan lines which can be rendered with the available information and renders those. FIG. 2 illustrates the process of rendering the drawing in FIG. 1. Rendering begins at scan line 38, which is the first scan line of the image and proceeds towards the bottom of the drawing. In the first stage, scan line 38 is created. The first scan line from the background object does not intersect with the "heart" object 6 or the "greeting" object 8. For this reason, the first scan line can be rendered. The background then produces the input 40 for the next scan line. It can be seen that "heart" object 6 does affect this scan line. The scan line from the background is provided to object 6 to allow it to render itself to the appropriate portion indicated by step 3. "Greeting" object 8 has no effect on the scan line (step 4), and therefore, scan line 40 can be rendered in the final image.

In stage 3, scan line 42 is created. Both of the objects 6 and 8 will affect this scan line. Again, the process starts by the background providing input for the deepest object affected, in this case, object 6. Object 6 then renders whatever portion of the scan line it affects into the scan line (step 5) and passes the result to the next upper object, namely object 8. Object 8 then takes the required input from that scan line and uses it for rendering into the relevant portion of the scan line, step 6. Once again, the scan line of the final image can be rendered, but note that in this case the text region of object 8 does not in fact intercept scan line 42, and thus, object 8 will have no effect on this particular scan line. This process repeats itself for rendering scan lines 44, 46, 48, 50, 52 and 54.

A shaded box indicates that the object does not affect the output whereas a non-shaded box indicates the object affects the scan line of the image.

FIG. 1 is a very simple image where each scan line of the final image is determined based on the two one to one objects and there is no requirement for additional object information of "adjacent" scan lines. One to one objects merely require the net effect of the objects below on the given scan line to render their effect. Not all objects are one to one and some are referred to as "look around" objects. A "look around" object requires multiple scan lines to allow the effect of the object to be determined. An example of a "look around" object would be an object which includes blur, a wave or other specific effect. It should be noted that either the region or the tool may require this "look around" feature and if either the region or the tool is considered to be "look around", the object is a "look around" object.

Most graphic images are more complicated than FIG. 1 and involve "look around" objects requiring additional information before they can be rendered. To overcome this problem, the prior art has rendered each object in its entirety and then passed that complete information onto the next highest ranked object so that all information is available, as all lower objects have been fully rendered. This suffers from very significant problems with respect to the size of memory required to store the necessary information.

In contradiction to this approach, the present system renders the image in a number of distinct stages where the stages do not require all of the lower objects to be fully rendered and, in fact, only portions of the objects are typically rendered. This will be explained with respect to FIG. 4.

Figure 4:
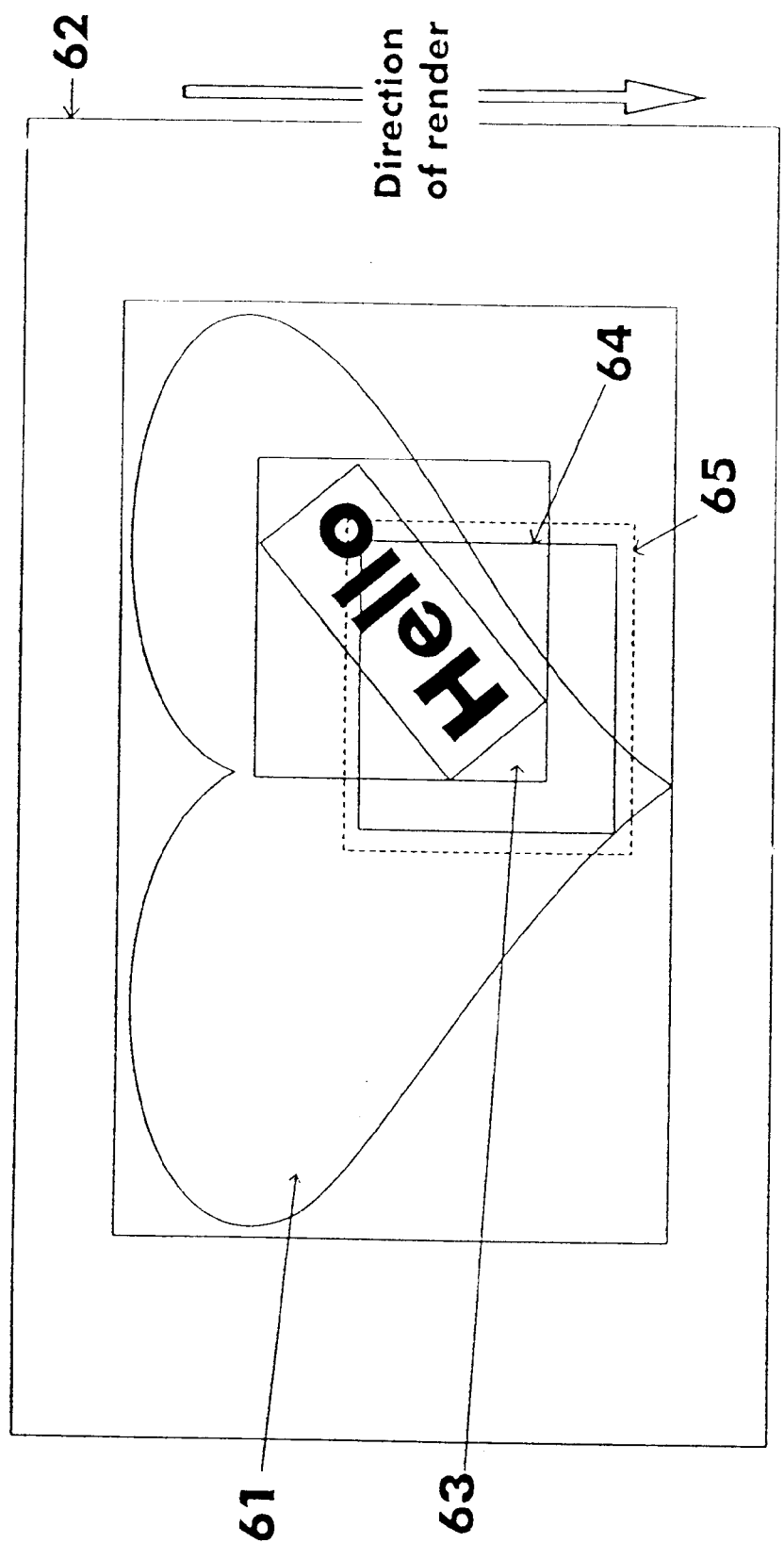
FIG. 4 is a depiction of a rendered image having a "look around" object.
Figure 5:
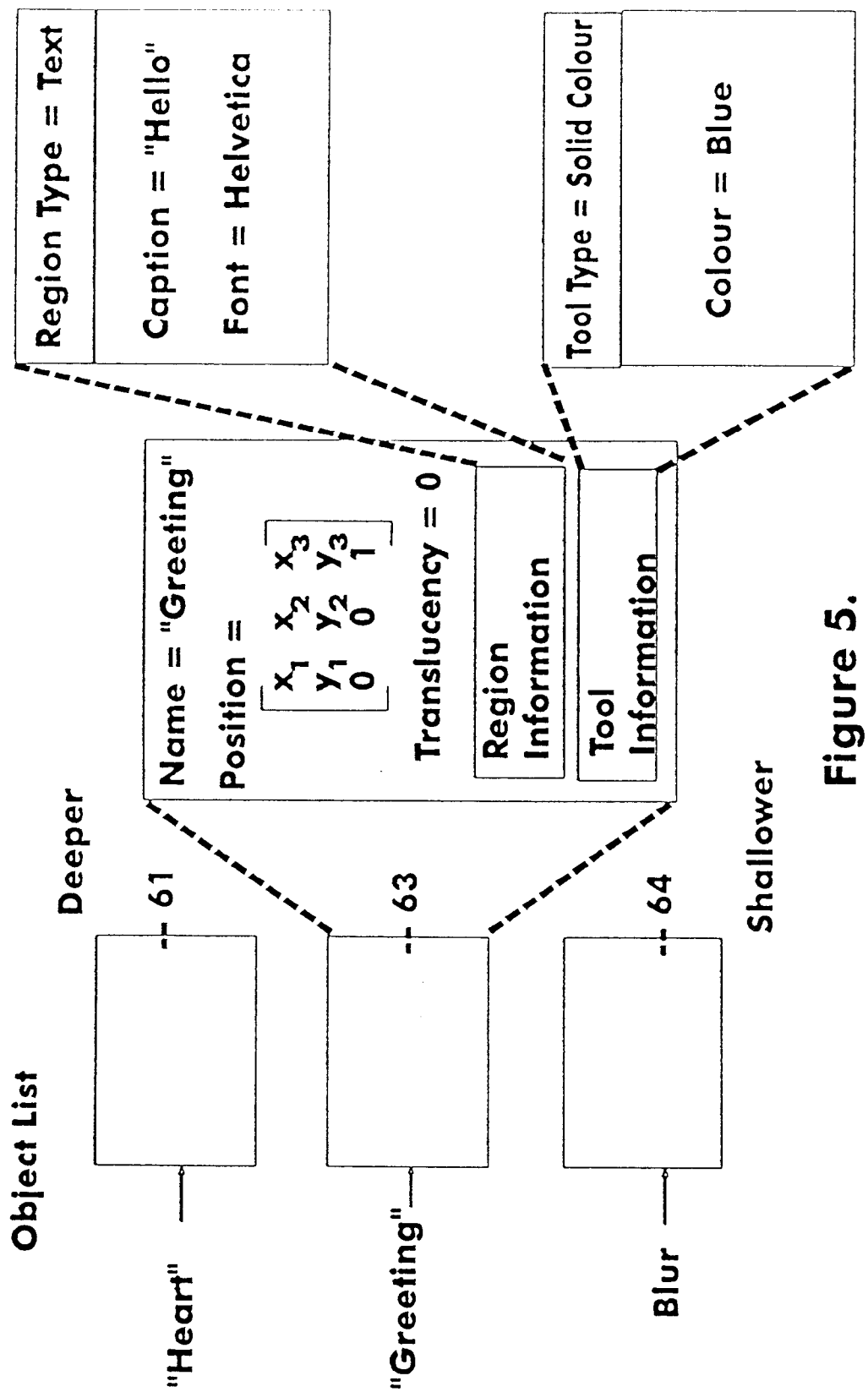
FIG. 5 illustrates the list of objects associated with the image of FIG. 4.

FIG. 4 shows an image 62 which includes the earlier "heart" object 61 and "Greeting" object 63 used in FIG. 1 with "blur" object 64 being added and which is a "look around" object. The object list is shown in FIG. 5. Object 64 is a rectangle region with a "blur" tool, which in this case will require three scan lines of lower objects to allow its effects to be determined. (To "blur" a given point requires information about the points around it, as indicated by area 65.)

Figure 6:
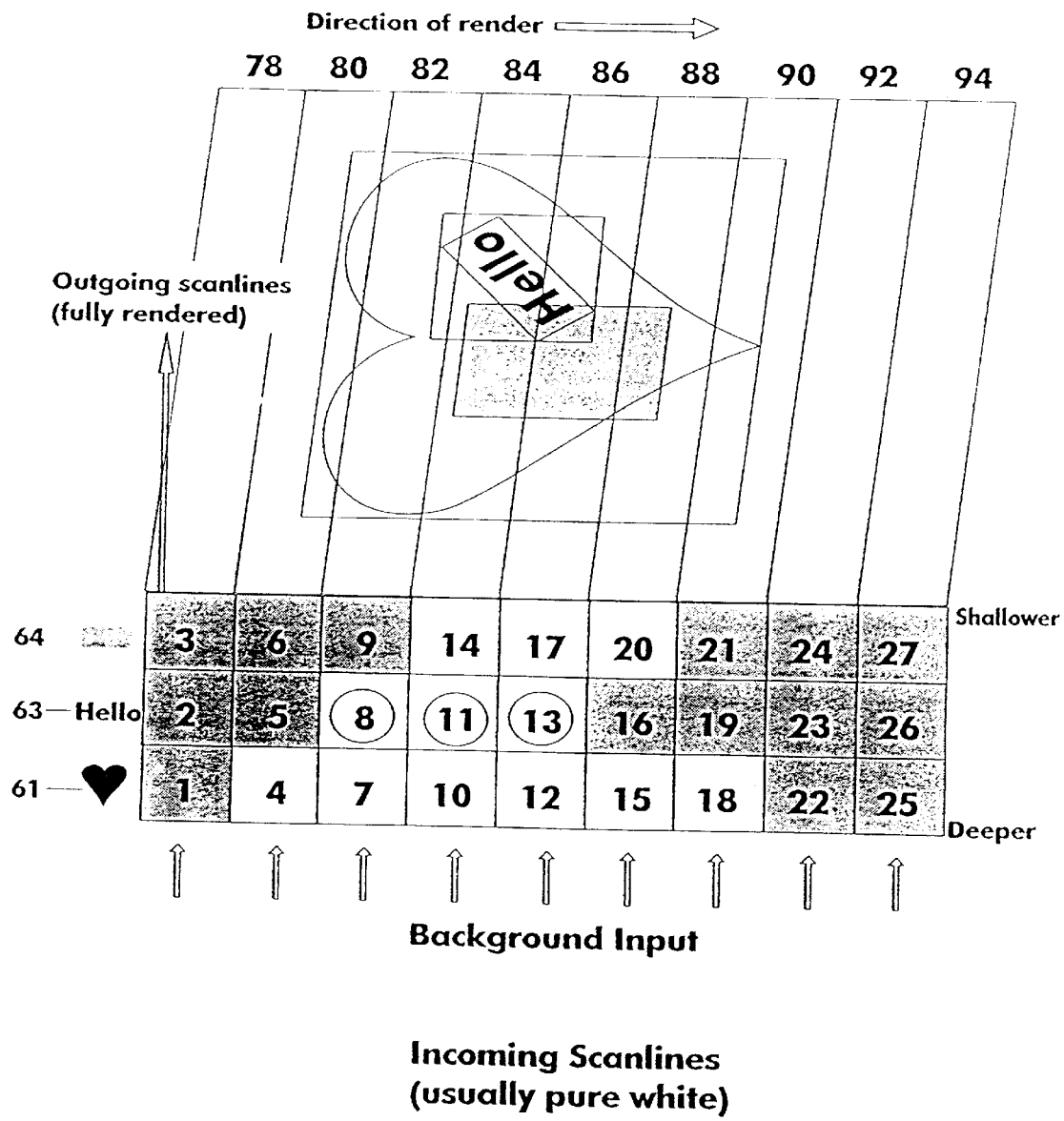
FIG. 6 is a depiction showing how various objects are used by the render engine to produce the image of FIG. 4.

FIG. 6 shows the sequencing steps for producing scan lines for the image of FIG. 4. As with FIG. 1, scan line 78 (the first scan line) (steps 1, 2, 3) is able to be returned as well as scan line 80 (steps 4, 5, 6) by looping through the objects. Scan line 82 is able to go through the first two objects (steps 7 and 8), and the "blur" object 64 at step 9 then recognizes it will require the output at step 8 to eventually return scan line 84. The circle about step 8 indicates the "blur" has maintained a temporary copy of what step 8 provided thereto for its future use. Scan line 82 is returned at step 9. The procedure then returns to the beginning of scan line 84 and step 10 applies the "heart" object and step 11 applies the "greeting", object. This result is provided to the "blur" object which temporarily stores the result indicated by the circle about step 11. The "blur" is stalled as scan line 84 cannot be returned. In order to return scan line 84, the "blur" requires the result of steps 8, 11 and 13. Step 13 is yet to be determined.

Step 12 considers the "heart" object and step 13 considers the "greeting" object. Step 13 allows the "blur" object to output scan line 84 (step 14) Step 14 will overwrite the result of step 11 required by the blur object. Therefore prior to step 14 a temporary copy of the result of step 11 is made for the blur object (indicated by the circle about 11). The procedure returns to the lowest object at step 15. At step 16, the "greeting" object is now complete and the result of steps 15 and 16 is passed to the "blur" which at step 17 returns scan line 86. Before step 17, the results of step 13 are maintained in temporary storage for the blur indicated by the circle about 13. The result of step 16 is still available for use at step 20. At step 18, the "heart" object is rendered, step 19 is complete as "HELLO" has ended. This then allows scan line 88 to be returned at step 20 and scan line 90 at step 21 as the "blur" is now complete. Steps 22 through 27 are straightforward as all objects have no effect and scan lines 92 and 94 are sequentially returned.

From the above, it can be seen that partial results are processed by the objects as required to return a scan line. Memory storage is reduced and confined to "look around" objects. For each scan line, the appropriate portions of objects are considered. Memory used for temporary copies are reused once their purpose has finished (i.e., no longer required by the object). Only those portions of the objects required to render a scan line of the objects above are actually rendered. This may require rendering of different number of scan lines of the objects with the deepest object always having the most rendered scan lines at any one point in time. This typically decreases as you progress up through the objects.

Pseudocode is shown in FIGS. 7 through 10 and illustrates the various steps used in rendering scan lines of the image based on partial consideration of objects.

The pseudocode comprises three main procedures, namely initialization of the objects to be rendered (Render-Init), rendering the objects on a scan line by scan line basis (Render-Stage) and releasing used memory resources after the rendering is complete (Render-Term).

The initialization routine is described in FIG. 7. The Render-Init routine performs the following calculations on every object that exists, namely: determine the object's position in the world coordinate space, then determine if any portion of the object is within the output region, and if so, determine any applicable look around region for the object. Render-Init also calculates the required resultant input region necessary to render the image within the render area. The information regarding what objects must be rendered and the input region is retained for use by other routines.

The rendering routine, Render-Stage, is described in FIG. 8. The rendered region is segmented into scan lines. The routine considers each scan line in turn. Further, for each scan line, each object is considered in order of its ranking, from lowest to highest. If the current scan line does not contain the current object, the next highest object is considered. Otherwise, if the current object does not require additional adjacent scan lines to render its look-around effect, then its current scan line is rendered. However, if the current object does require additional scan lines, the scan line is stalled. Information of all scan lines of object beneath the stalled scan line is then stored in memory. Next, the routine attempts to render as many scan lines as possible when it considers a stalled object. As that scan line for the object has been considered, the next highest object is considered. After all the objects of the current scan line have been considered, the next scan line is analyzed. The procedure is repeated until all objects in all scan lines have been considered.

Herein is the concept of stages. A stage is a section of the image which has been rendered. When there are no look around effects to consider, a stage consists of one scan line. However, when a stage involves stalled objects, multiple scan lines are calculated as the stall clears. Therefore a stage consists of a plurality of rendered scan lines, the number depending on the look around effects of the rendered images.

The final routine is the Render-Term shown in FIG. 9. Its function is to release all temporary memory resources acquired by the program during the Render-Init and Render-Stage routines.

FIG. 10 is an example of the use of the three procedures to render an image.

FIG. 11 illustrates a typical output of the render engine. The information contained in the picture of that cat, as a colour bit-map requires approximately 18 megabytes of memory. The render engine uses stored cat object. The render engine program and the operating system of the computer require an additional 10 megabytes. Therefore, to render the image with the render engine, the computer system memory requirements total approximately 28 megabytes. This image can therefore be rendering completely within a computer with 32 megabytes of memory, without having to access slower, secondary storage to process the rendering. However, if the rendering was performed on current rendering systems, the bit-map of the cat and an additional bit-map of the output image for a high resolution output device (for FIG. 10 this required about 21 megabytes) have to be stored. Therefore the system requirements for the storing and processing the image by itself would be approximately 39 megabytes. Assuming that the current rendering systems also require approximately 10 megabytes for the program and the operating system, the total memory requirements to render the image using only the primary memory of the computer would be 49 megabytes.

The memory advantage of the present procedure increases as the resolution of the output device increases and colour requirements increase. This advantage is achieved while full object independence is maintained and has great benefits for the network arrangement shown in FIG. 12. "Look around" objects require lower objects to pass on their output for certain adjacent scan lines before the "look around" object can render a scan line. In FIG. 4 the blur object required three scan lines from lower objects. The "look around" object makes itself temporary copies of any necessary information that will otherwise be lost before the "look around" object can render. "Look around" objects cause lower objects to continue the process of rendering a scan line in their normal manner and pass the output to the next object until these lower objects have produced the required information for the "look around" object to produce a scan line which then passes this to the next highest object. Return of a scan line causes the lowest object to render its next scan line. In this way, objects can be working on different scan lines. A "look around" object causes objects thereabove to be developed until the "look around" object has the required information to output a scan line.

The objects have been described as still objects, but this procedure can also be used for motion objects such as video images.

The characteristics of the preferred embodiment of the invention include:

1) ease in manipulation of the image as all objects remain fully changeable irrespective of other objects;
2) relatively low memory requirements due to scan line by scan line rendering and use of vector based objects;
3) actual resolution determined by the output devices when an image is rendered;
4) objects can use the results of earlier objects as input to apply the object effect to all objects therebelow;
5) complex special effects are easily implemented; and
6) ease of expansion due to additional tools used by the various regions. Additional regions can be paired with the various tools.

The method as described in FIGS. 1 through 11 renders an image on a line-by-line basis without necessarily rendering the entire image. For many images, this results in a much more effective and efficient process of rendering the image with reduced processing time and the ability to only rerender portions of a composite image when minor variations are made.

Advantageously, this method is used by a server receiving instructions from a client connected to the server by a network. The client can transmit instructions to the server regarding changes to a portion of the image and only these portions of the image are rerendered by the server, thus reducing the time for effectively rerendering the image and reducing the amount of information transmitted.

As shown in FIG. 12, the Internet server 100, which in this case is shown as the host, Truespectra, has associated therewith a COLORWAVE™ server 300 with an image database 104. The Internet server 100 performs the normal functions necessary for a home page, etc. and has a link to the COLORWAVE server when image manipulation is desired. Server 100 can hand off to the COLORWAVE server 102, which, if desired, can directly communicate with the client computer 106 over Internet, indicated at 108. Server 100 and server 102 can be combined, as indicated by the border 110. Therefore, link 112 could be an Internet link or a direct link. Handing off to the COLORWAVE server 102 allows for efficiencies, as this server 102 is designed for image manipulation and transmission.

The database 104 has certain images stored therein and the server 102 provides the client 106 with instruction commands for modifying the images. The client and the server are separated by the network 108, which can be Internet, Intranet or any other network. The client 106 is connected to Internet in any suitable manner. The client 106 is provided with certain software for providing instructions to the server for modification of the images or control of the graphic software located on the COLORWAVE server 100. The client portion 106 is designed to use the minimum of resources and, in many cases for printing high resolution images to a printer 114, never has to store the entire high resolution image. This is termed a "thin client". The client issues commands to the server, which executes the commands of the client and returns the requested results. The server portion performs all of the image processing, special effects, importing images (bitmaps) and renders the output at the appropriate resolution for the display screen 116 of the personal computer or for the resolution of the printer 114. Therefore, during initial image modification, the image is transmitted to the client 106 at the resolution for the computer screen 116 and later, when the image is to be printed, will be sent at an appropriate resolution for the printer 114.

The client provides instructions to the server for producing an image and the results of these instructions are sent to the client for display on a relatively low resolution display device, such as a computer screen, at approximately 72 dpi. The client may instruct the server with respect to further modifications to the image and the server then determines what portions of the image would change due to these instructions and then returns to the client the changed portions of the image. In this way, the entire image need not be retransmitted to the client. The commands to the server from the client are short, consisting of changes to be made to the image. The image can be transmitted quickly, as only a modest amount of data is transmitted from the server to the client, consisting of the rendered changes to the image. In addition, this changed data may or may not be compressed using standard technology. As can be appreciated, depending upon the extent of the changes, this can be many times more effective than rerendering of the entire image.

The client may, at some point, determine that the image is suitable for printing. A request for printing is sent to the server 100 including specific information about the printing characteristics, including type, resolution, and special characteristics, such as colour management information, so that the server can appropriately render its output for the device.

With traditional methods of transmitting an image, the image is stored in a display format known as RGB in which a pixel for display is represented by 8 bits of colour information in each of the red, green and blue channels. This results in approximately 125 Mb of data when a full page print is rendered at 720 dpi ($3 \times 720^2 \times (80$ sq. in.$)$). During the rendering process of the present invention, the render engine is preferably requested to dither the data and render the image scan line by scan line in the CMYK colour space. This transformation reduces the data to 3 bits per pixel instead of 24, reducing the amount of data in 720 dpi print image to 15 Mb, for a 360 dpi print image to 3.8 Mb. This data may be compressed further using standard (LZW, Fractal, Wavelet, etc.) data compression technology. The image is rendered on a scan line by scan line basis and it is transmitted over Internet overlapped with the rendering process and printing may begin immediately on the client end before the entire image has even been rendered. This allows the overlap of three critical operations, namely:

1. Rendering/dithering;
2. Network Transmission; and
3. Printing.

In this way, the high resolution print image is not required to be stored in a complete form. This greatly removes the burden of traditional methods where the client must store the entire print image.

The present inventions provides for ease of retrieval and use of images particularly in a client server network arrangement. Client computers operate using a program which communicates with other networked devices involved with image transfer using a predetermined image standard and control signals. The server provided with an image database also uses programs which communicate with other image transfer devices utilizing the predetermined image standard and control signals. The image transfer is accomplished over the network using the predetermined standard and control signals thereby allowing access and retrieval of images stored in a database without knowledge of applications used to store the image in the database.

Figure 13:
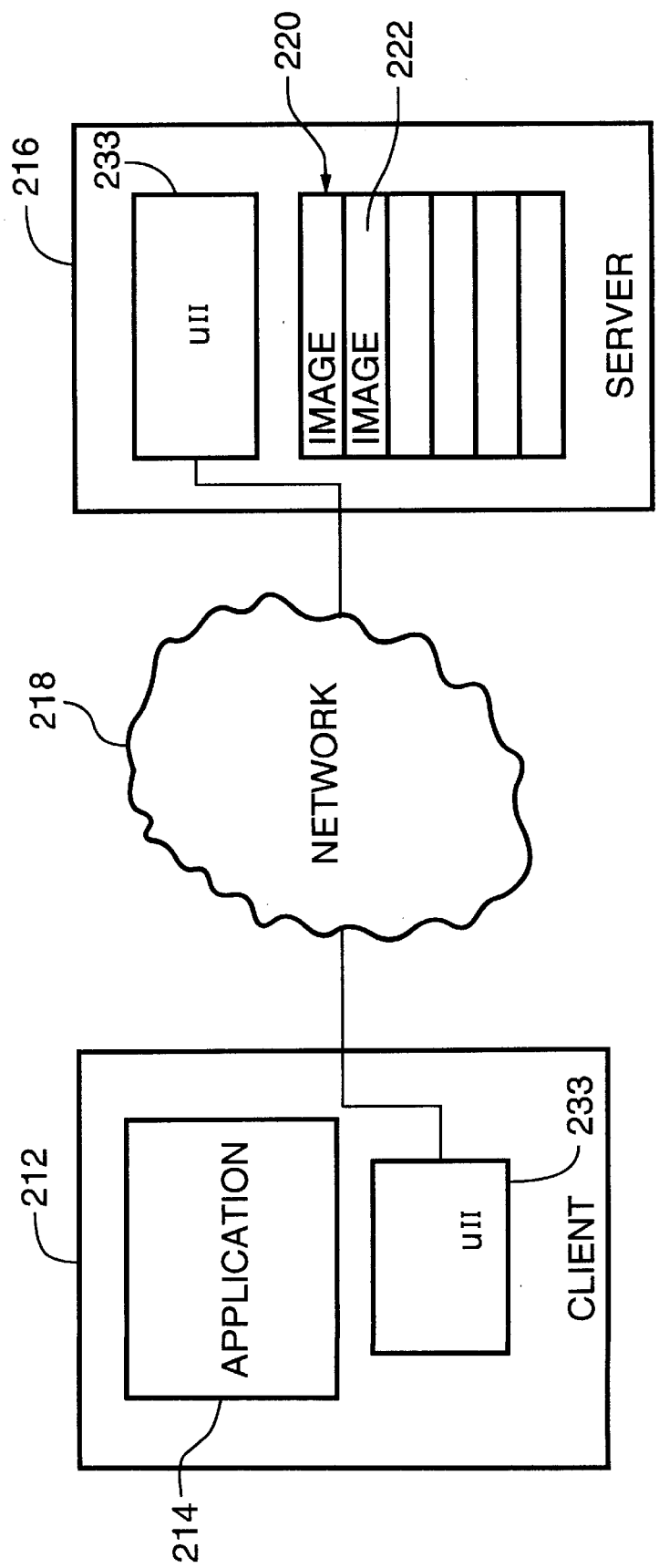
FIG. 13 is a schematic illustrating a preferred embodiment of an image database access system using the Universal Image Interface (UII) of the present invention.

As shown in FIG. 13, in a preferred embodiment, the present invention, in one aspect, is directed to a system for accessing, modifying, and transporting images over a computer network. The system comprises at least one client computer 212 for accessing the images and utilizing them in at least one application 214 for utilizing the image and at least one server computer 216 which stores or serves up the image in response to commands from the client computer 212. The client computer 212 and server computer 216 exchange the data and control signals over a network 218 using a network transport protocol as a middleware. The server computer 216 is provided with at least one image database 220 which contains images 222 stored in one or more image file formats which are in common use. The server 216 may use distinct programs for storing, managing and accessing each file format associated with the stored images.

The present invention in this aspect provides for a predetermined image standard for transferring a stored image and predetermined standard control signals for accessing and processing selected images. These standards are defined through a Universal Image Interface (UII) which enables a client and in particular any application or program on the client to access image databases to retrieve stored images. The client application sends instructions using the UII and retrieves images in a format defined by the UII. In this way, it is not necessary for the client application to be capable of retrieving images in a plurality of file formats nor is it necessary for the client to be aware of the transport protocol utilized for transporting the image. The client application need only be capable of sending and receiving instructions according to the UII standard and utilizing images formatted according to the UII image standard.

Figure 14:
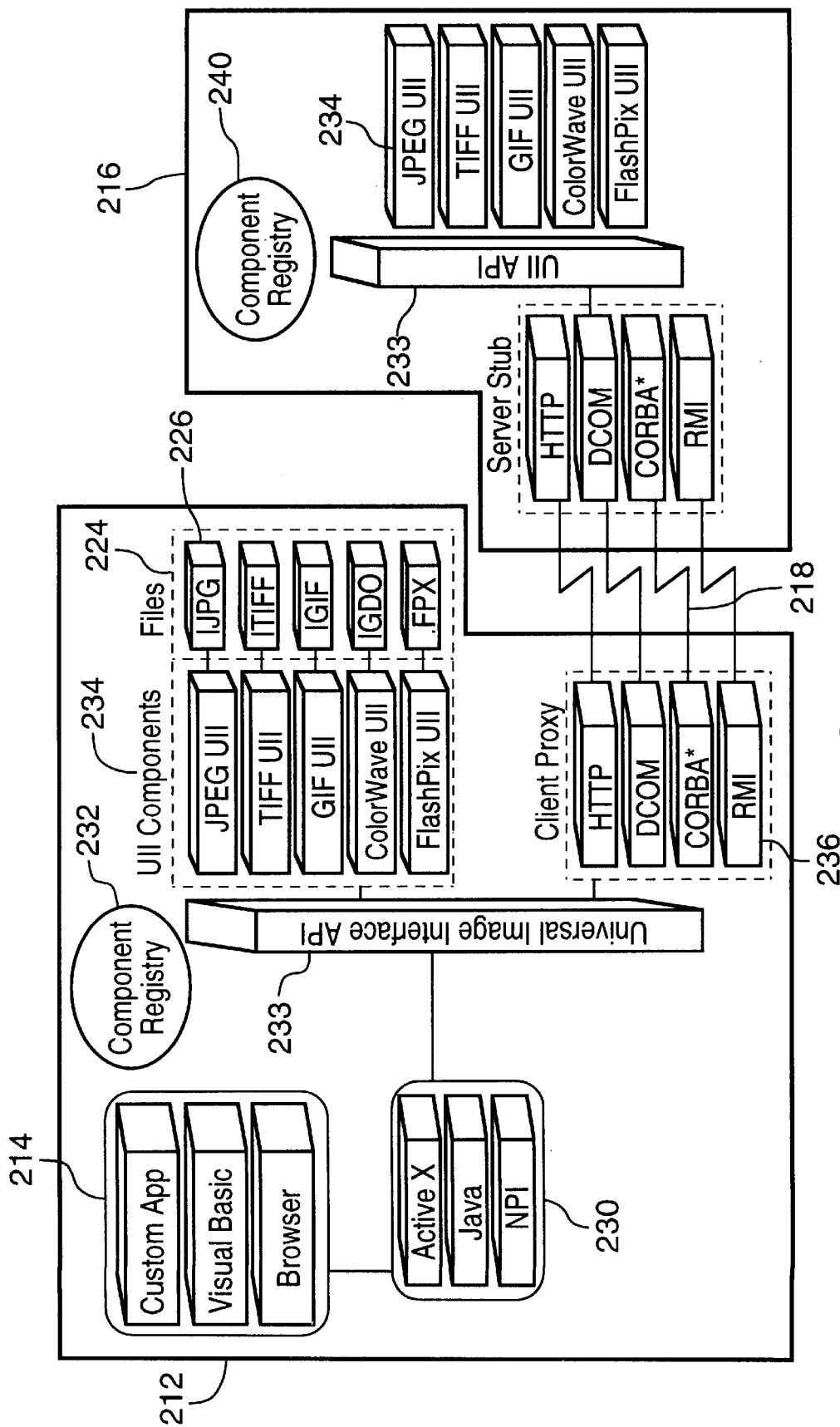
FIG. 14 is a schematic illustrating the interaction of the components making up a first preferred embodiment of an image database access system using the defined UII of the present invention.

As shown in FIG. 14 the client computer 212 has at least one application 214 which accesses and employs image files or portions thereof retrieved from an image database 220. The application 214 could be a browser or could be a custom application. The application 214 contains or interacts with a software module 230 which conforms to the UII standard to send and receive control signals and retrieve the images from the image database 220. The software module 230 contacts a component registry 232 to determine which UII components 234 are available to it. These UII components 234 provide the access to the various image formats stored in the image database 220 as well as the various transport protocols utilized for transport of the commands and images.

As illustrated in FIG. 14, the pre sent invention is also usable with local image databases 224 resident on the client computer 212. In this configuration, the software module 230 contacts the component registry 232 to determine the image type UII components 234 which are available to it. When the application 14 accesses an image 226 in the image database 224, the software module 230 sends a command to the relevant UII component 234 to retrieve the image file 226 and return it according to the UII standard. The UII component 234 reads the image file and converts it to the UII standard and then passes the image information to the software module 230 which makes it available to the client application 214.

When the application 214 is accessing images 222 across a network 218, the software module 230 checks the component registry 232 to determine client proxy transport protocols 236 which are available to it. A command or control signal is then sent to the remote server 216 using the proxy-stub arrangement 236 over the transport protocol to the component registry 240 on the remote server 216 to determine the image type UII components 234 resident on the remote server 214. When the application 214 is accessing images 222 on the remote server 214, the software module 230 passes the commands or control signals to the remote server 216 using the proxy-stub arrangement 236 of the transport protocol. The server 216 receives the command or control signal and passes it to the image type UII component 234 which retrieves and converts the image and sends it back to the client 212 using the UII standards.

As illustrated in FIG. 14, the server database 220 or 224 may contain images 222 or 226 stored in one or more formats selected from JPEG, TIFF, GIF, FLASHPIX™ and other image file formats. Each of the image formats in the image database 220 or 224 has associated therewith an image type UII component 234 which receives the UII standard commands or control signals and retrieves and converts the image 222 or 226 in the database 220 or 224 to the UII image format for use by the client 212.

As is also illustrated in FIG. 14, the server computer 16 is connected to one or more client computers 212 using a proxy-stub arrangement 236 for passing the commands and control signals over a network 218 which operates using a commonly employed middleware. The middleware or network protocol may be any of the commonly employed protocols which can include HTTP, Distributed Common Object Model (DCOM), Common Object Request Broker Architecture (CORBA), RMI or other commonly employed middleware. The use of the proxy-stub arrangement 236 simplifies the passing of control signals and retrieved images 222 over the middleware as it is not necessary for each of the client applications 214 to have the capability of recognizing and supporting each of the middleware. Rather the client application 214 has only to be able to generate and receive control signals and images according to the UII standard. The use of the UII standard in combination with the proxy-stub arrangement 236 also eliminates the need for the middleware to be configured or adapted for each of the client applications 214, rather it only has to recognize and pass control signals and retrieved images.

The present invention is particularly useful with client applications 214 which may not only be retrieving the entire image file 222 but may either be retrieving only a portion of the file or may be manipulating the image 22 in other ways. Preferably, the UII image standard allows the image to be defined not only as an overall image but as components or objects of the image. For example, the FLASHPIX™ standard developed by the EASTMAN KODAK COMPANY defines an image as a series of tiles which are combined together to form the overall image. The UII image standard could also define images as a series of tiles and the standard could permit the client to retrieve only certain tiles from the overall image.

When an application 214 makes a call to the UII 233, the UII 233 accesses the relevant databases 224 for the relevant data image. The UII can then virtually parse the image into tiles. Resolution, pixel size and image size may also be calculated from the header information in the image file. If the application issued a call to request a particular tile, the UII 233 will return to the application 214 a data pointer to the relevant tile. Note that the UII resolution, size and tile data fields of the image data are used solely by the UII and do not alter the data of the image itself. Successive calls to the UII allow the application to access multiple tiles of the image.

FIG. 15 shows the application calls recognized by the UII. To access a an image or a tile of an image, the calling application must use one of the calls defined in the Image-Source or the ImageSourceModule. The UII will then process the request, access the corresponding image database, perform the necessary data conversions and provide return data to the call.

Following is a summary of function of the calls in the ImageSourceModule, the main call processing unit of the UII:

| Call | Function |
| --- | --- |
| getResCount | returns the resolution count of the image to the calling application |
| getTileCount | returns the total number of tiles from the image to the calling application |
| getPixelSize | returns the pixel size of the image to the calling application |
| setRegionOfInterest | Sets the Region of Interest of an image as defined by the calling application |
| getRawTile | returns data about the requested tile to the calling application |
| getTile | returns data about the requested tile in the UII format to the calling application |
| getCompressionInfo | returns compression information about the image file to the calling application |
| getColorspace | returns Colorspace information about the image file to the calling application |

Figure 16:
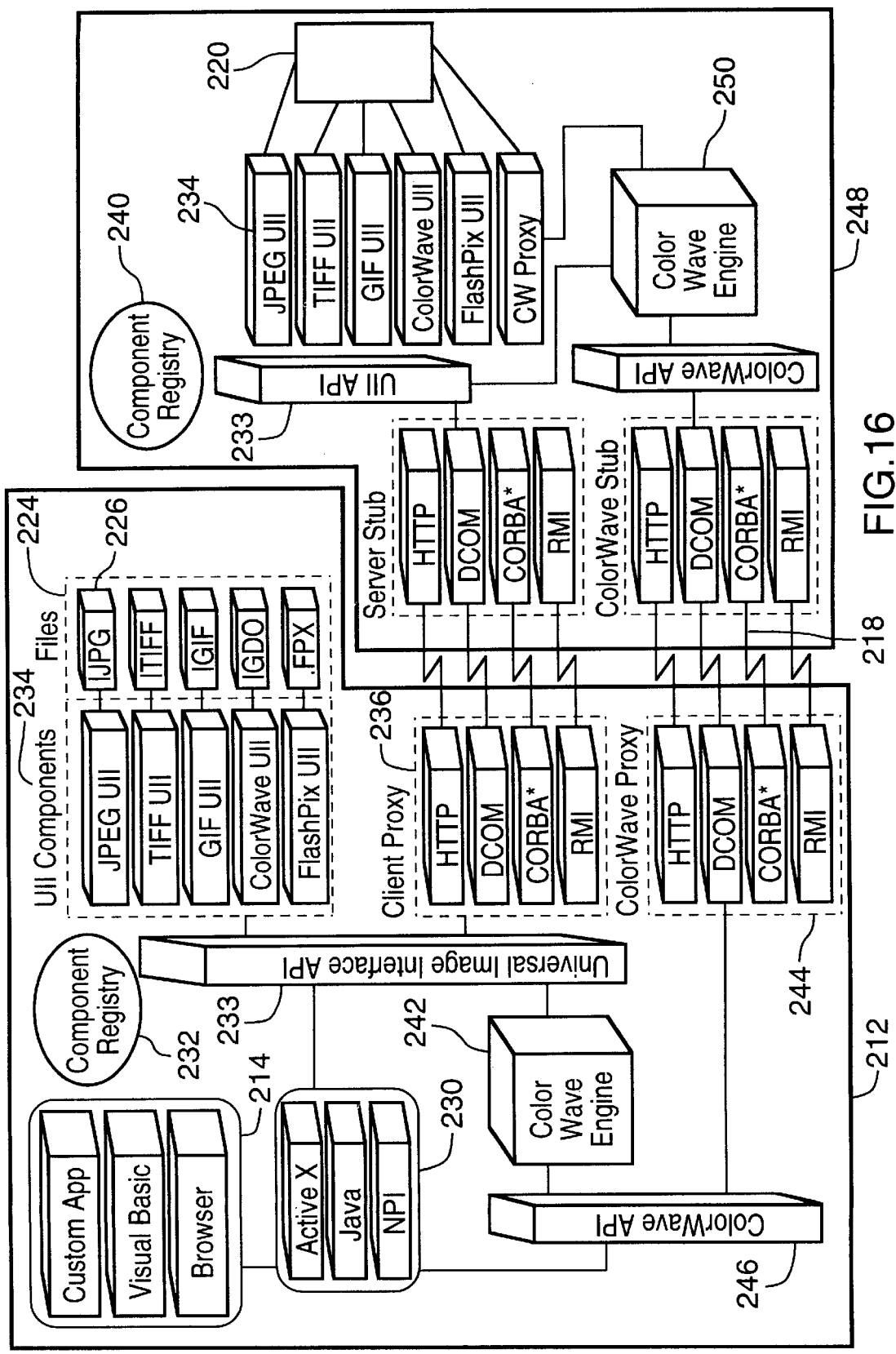
FIG. 16 is a schematic illustrating the interaction of the components making up a second preferred embodiment of an image database access system using the defined UII of the present invention.

As illustrated in FIG. 16, the client and/or server may also have render engines 242 described above associated with the client application and/or server database. In such situations the image may be rendered by the render engine 242. If the render engine 250 is resident on the server computer 246, and the client application 214 is aware of render engine 250, the client application 214 could send control signals to the server in the manner described above to instruct the render engine 250 to render the image and then pass the rendered image to the client using the UII image standard. Alternatively, if the render engine 242 were resident on the client 212, the client 212 could utilize the render engine 242 to render the images received from the server 216 in the UII image format and pass the rendered image to the render engine aware client application 214.

Advantageously, this method is used by a server 248 receiving instructions from a client 212 connected to the server by a network 218. The client 212 can transmit instructions to the server 248 regarding changes to a portion of the image and only these portions of the image are re-rendered by the server 248, thus reducing the time for effectively re-rendering the image and reducing the amount of information transmitted.

As shown in FIG. 16, the server 248 has associated therewith a COLORWAVE™ render engine 250 as described above along with the image database 220. The server 248 performs the functions described above and has a link to the COLORWAVE render engine 250 when image manipulation is desired. Server 248 can hand off to the COLORWAVE render engine 250, which, if desired, can directly communicate with the client 212 using a proxy-stub arrangement 244 specific for the control signals and image data utilized by the render engine 250. Handing off to the COLORWAVE render engine 250 allows for efficiencies, as this render engine 250 is designed for image manipulation and transmission.

The database 220 has certain images stored therein and the server 248 provides the client 212 with instruction commands for modifying the images. The client 212 is provided with certain software for providing instructions to the server 248 for modification of the images or control of the COLORWAVE render engine 250 on the server 248. The client 212 is designed to use the minimum of resources and, in many cases for printing high resolution images to a printer, never has to store the entire high resolution image. This is termed a "thin client". The client 212 issues commands to the render engine on the server 248, which executes the commands of the client 212 and returns the requested results. The server portion performs all of the image processing, special effects, importing images (bitmaps) and renders the output at the appropriate resolution for the requirements of the client application 214.

As is also shown in FIG. 16 the client 212 may be provided with a render engine which may interface with the client application 214 through an appropriate Application Program Interface (API) 246.

The network uses one network middleware of a series of network middleware. Each image database includes a predetermined image standard for transferring a stored image and includes predetermined standard control signals for accessing and processing selected images. The client computer includes application software with the capability to communicate with any of the image databases using standard predetermined control signals and the capability of receiving images using the predetermined standard for transferring an image. The client computer and server computer uses a proxy-stub arrangement for compensating for different middleware. Image manipulations, transfer and receipt occurs based on the predetermined standard for transferring and image and the predetermined control signals. The proxy-stub arrangement allows for a high degree of compatibility without knowledge to the user of the various operating platforms, applications, protocols and middle ware. The proxy-stub arrangement to overcome middle ware issues is practical as the complexity thereof is greatly reduced due to the predetermined image standard opposed to full cross compatibility for all control signals and data files of host of programs.

Figure 17:
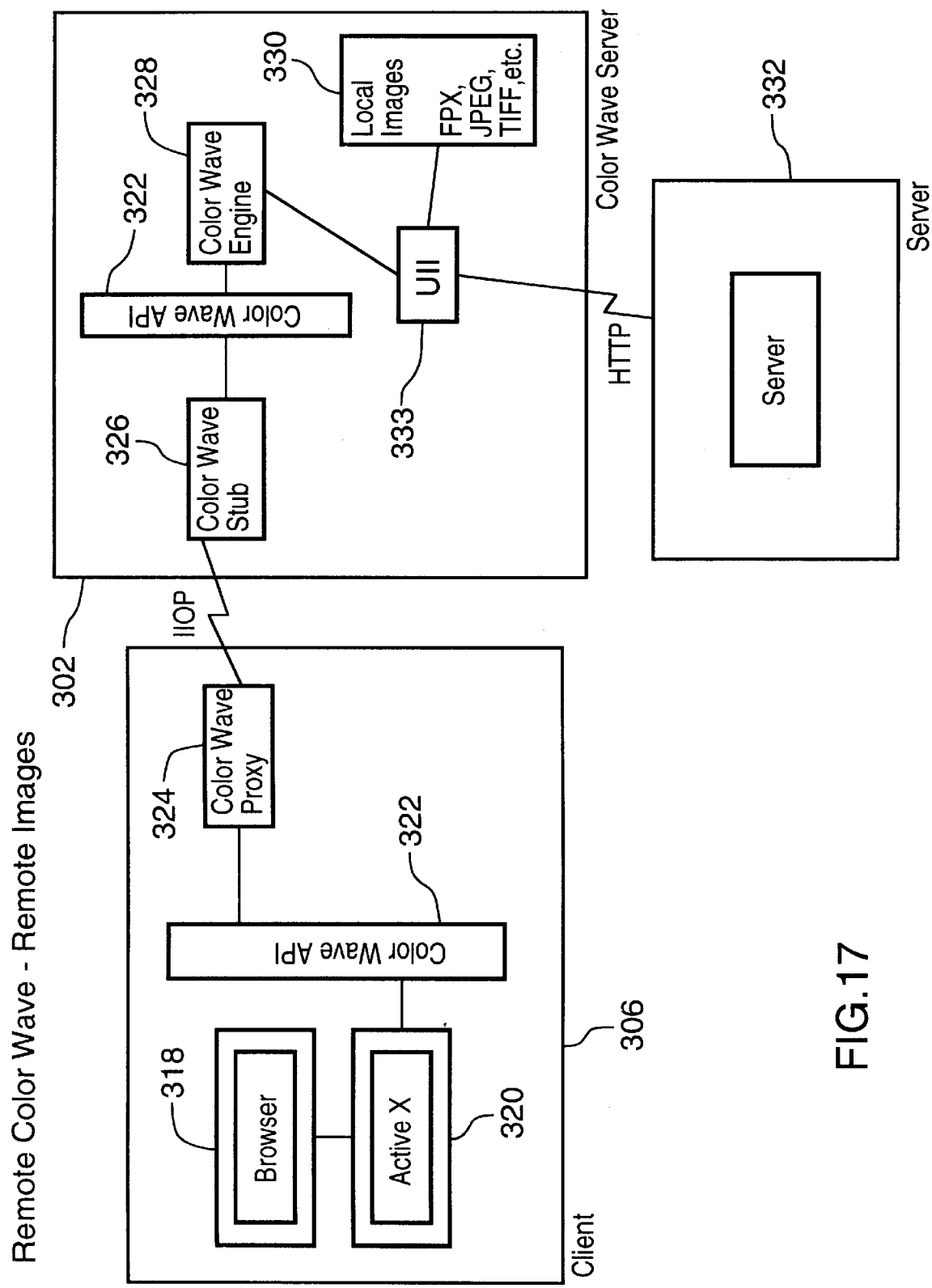
FIG. 17 is a further schematic of a network version of a thin client accessing a render engine server.
Figure 18:
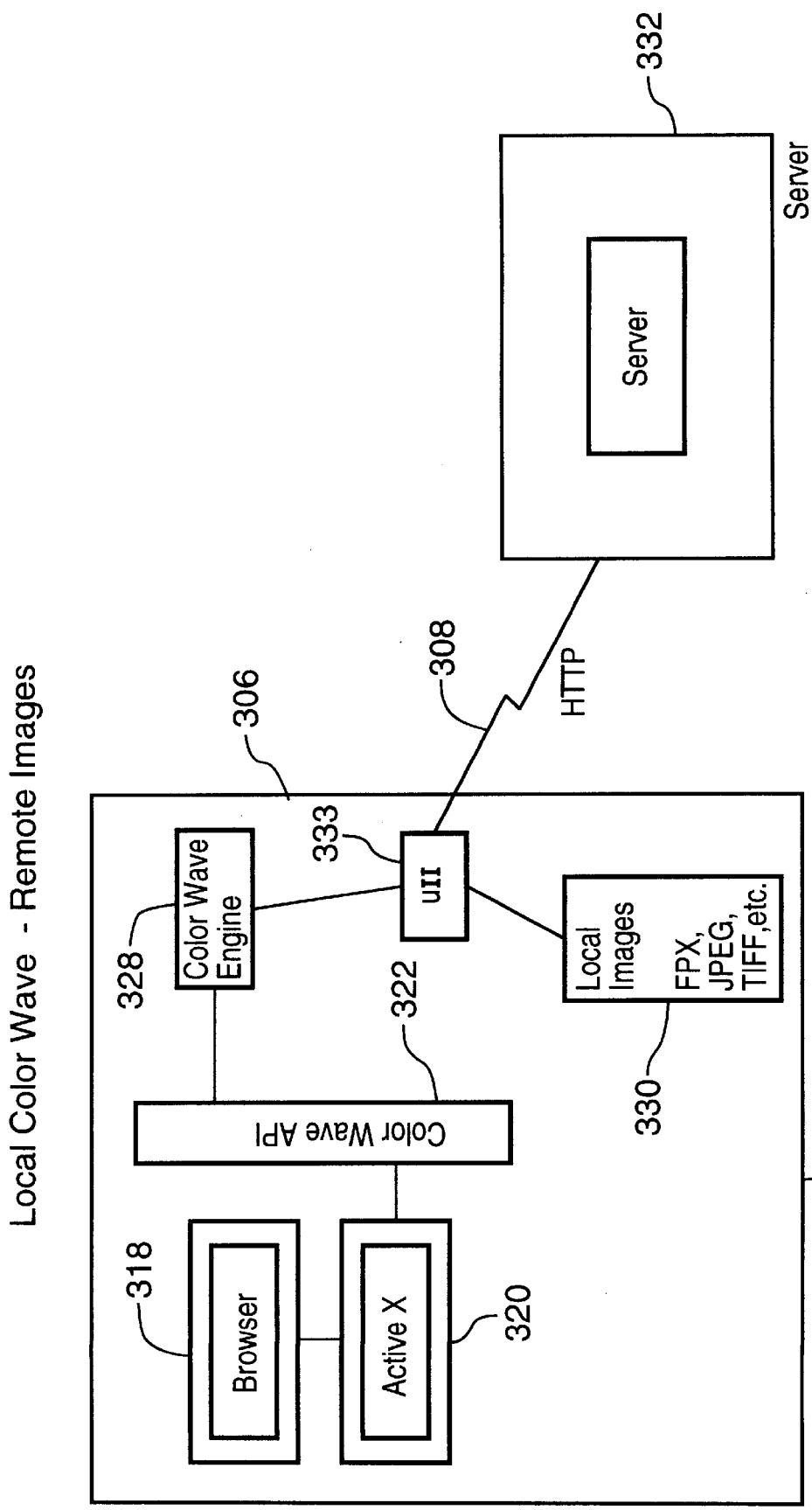
FIG. 18 is a schematic of a second embodiment of an extended version using a render engine client and an image database server.
Figure 19:
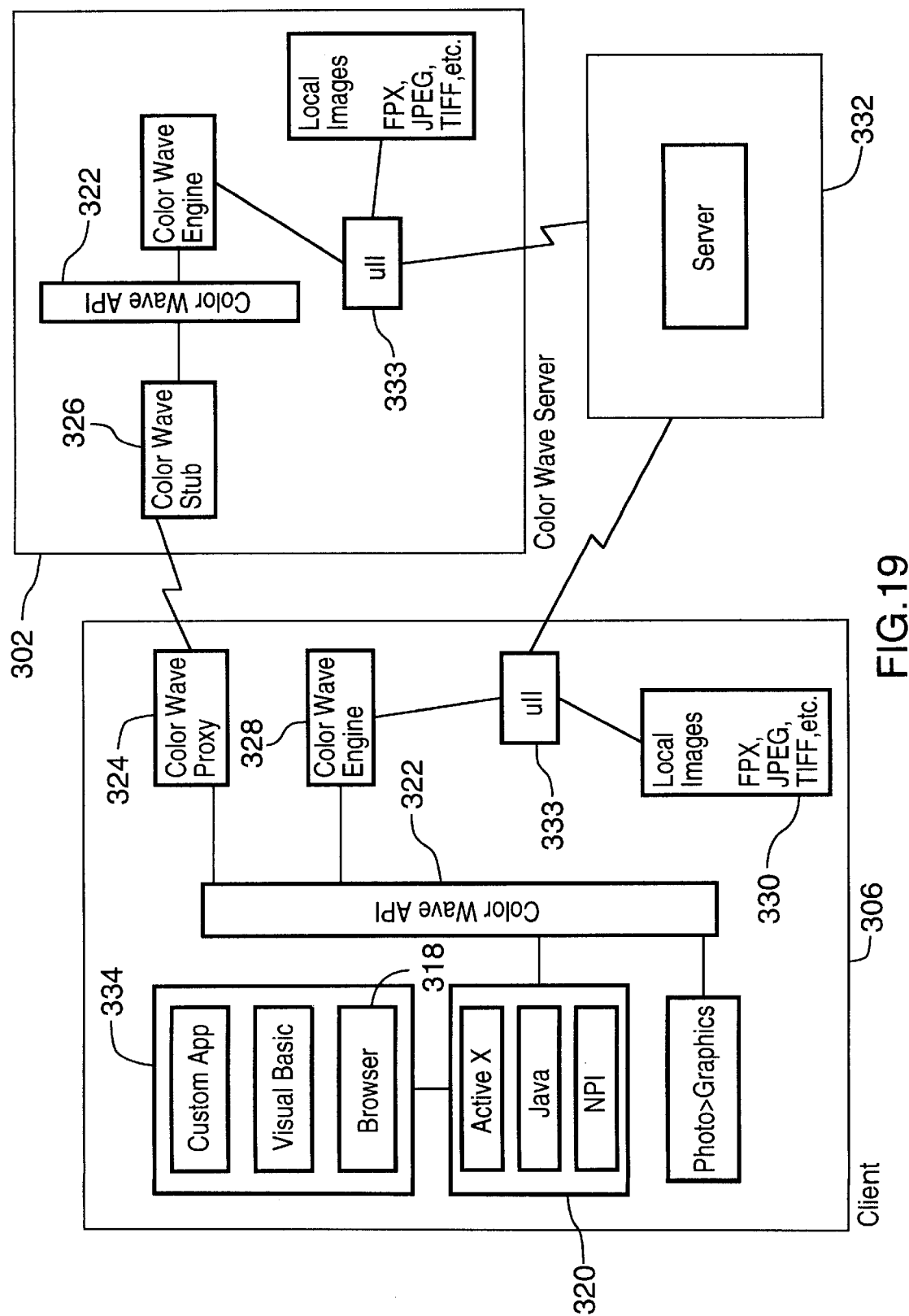
FIG. 19 is a schematic of a third embodiment of a render engine client and server and an image database.

Preferred implementations of the network setup of FIG. 16 are illustrated in FIGS. 17–19. The client 306 contains a browser application 318 which is render engine aware. In the embodiment illustrated in FIG. 17, the render engine aware capability is provided by a software module 320 which, in the embodiment illustrated in FIG. 17, this program utilizes Active X, however, as described above, other implementations are possible. This software module 320 conforms to the render engine application programming interface (API) 322 for issuing commands to the sever 302 and returning the requested results. In the arrangement illustrated in FIG. 17, the client 306 and server 302 are connected through a network utilizing the INTERNET interoperable ORB protocol (IIOP), however, as described, other network protocol are easily employed. The client 306 is provided with a specified proxy 324 which enables the passage of commands and data over the network 108 utilizing the IIOP protocol. Similarly, the server 302 is provided with a complimentary stub 326 specific for the commands and data required by the render engine to permit the server 302 to execute the commands of the client and return the requested results. This information is passed through conforming to the render engine API 322 and interacts with the render engine 328 on the server 302. As described above, the render engine accesses image objects such as local image files 130 which may be resident on the server 302. In addition, the server 302 has a capability of accessing remote images provided on a image server 332 through an UII 333 as shown in FIG. 17.

FIG. 18 illustrates a variation of the network version, wherein the client 306 is a smart client in that the client 306 contains its own render engine 328. In this setup, the browser 318, through the software module 320 sends commands conforming to the render engine API 322 to the render engine 328. The render engine obtains the image object from either a local image database 330 or from an image server 332 through UII 333 using an appropriate protocol for the network 308.

FIG. 19 illustrates a complete client/server network system incorporating the features of the thin client as illustrated in FIG. 17 and the smart client as illustrated in FIG. 18. Client 306 of FIG. 19 has one or more applications 334 which may include custom applications which interact with a browser 318. These applications 334 utilize software modules 320 which may be provided in Active X, Java or C++. This software module 320 permits the application 334 to be render engine aware to allow it to pass commands and receive data according to the render engine standard. The client 306 is provided with its own render engine 328 which is capable of rendering images using data from local image object databases and is also capable of acquiring image objects from a remote server 332 through UII 333. Client 306 is also capable of acting as a thin client accessing a remote render engine server 102 through the COLORWAVE API 322 COLORWAVE proxy 124 and COLORWAVE stub 326. Thus, client 306, as illustrated in FIG. 19 can render images based on image objects obtained from local image object database 330, resident on the client 306, image objects resident on the remote server 302 or image objects obtained from an image server 332.

A specialized printer may be provided which incorporates a render engine in hardware or software and the printer has the capability to print files in a conventional data standard and print images in a customized manner when the images are formatted in the universal format using the render engine to process the images. Such a printer can print the standard images quickly and free a user's computer for other uses. Such a printer having a COLORWAVE render engine (ie collectively renders, on a screenline basis, objects defined by a region and tool where screenlines are rendered normally by only partial rendering of each object) has many advantages particularly where the render engine is provided as hardware.

From the description of the invention, it can be appreciated that the invention provides applications with a standardized interface for accessing images. In particular, as new network transport protocols are implemented, as long as the new protocols adhere to the protocol requirements of the UII, the applications are freed from having to know how the new protocols operate. In fact, the applications never need to know the protocols of the network transport layer.

The present invention has been described with respect to the benefits possible for rendering an image to a high resolution device where the image is transmitted over a network, such as Internet, from a server to a client. This method has particular application for printing of images where high resolution is possible. It can be recognized that this technique is not limited to printing, but is applicable to any high resolution device which is receiving the data over a network, particularly a public type network available to generally unrelated users. With this arrangement, the client can easily adjust the images using the processing power of the server where command signals are transmitted to the client over Internet efficiently and the more sophisticated image manipulation is carried out by the server. The image is transmitted to the client line by line and the entire image need not be stored by the client. For example, it can merely buffer several scan lines or series of scan lines for the printer at a high resolution. The main point is that the entire image need not be stored for a high resolution printing operation. This has particular importance with respect to the printing of high resolution images, however, it may be useful for other high resolution applications.

This method has particular application where the client wishes to see the cumulative effect where only a portion of the image has changed. For example, a shirt and tie is displayed and then a different tie is selected. In this case, only that portion of the image changed by the new tie is rerendered and transmitted reducing the required bandwidth. Thus, the client can dynamically change images quickly and efficiently.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. A system for accessing, modifying, and transmitting images over a computer network comprising at least one client computer and at least one server computer which exchange data and control signals therebetween over a network which uses one network middleware of a series of network middleware, said system further including a plurality of image databases which databases use different programs for storing, managing and accessing said stored images, each image database including a predetermined image standard for transferring a stored image and including predetermined standard control signals for accessing and processing selected images, said at least one client computer including application software with the capability to communicate with any of said image databases using said standard predetermined control signals and receiving images using said predetermined standard for transferring an image, said at least one client computer and said at least one server computer using a proxy stub arrangement for compensating for different middleware, whereby image manipulations transfer and receipt occurs based on said predetermined standard for transferring an image and said predetermined control signals and wherein said predetermined image standard includes the following defined elements:

a first element to retrieve the resolution of an image associated with a stored image file, a second element to partition said image into sections, a third element to calculate a base pixel size of said image, a fourth element to define a region of said image, a fifth element to retrieve a section of said image, a sixth element to retrieve a processed section of said image, a seventh element to retrieve data compression information associated with said image and an eighth element to retrieve color information related to said image.

2. A system as claimed in claim 1 wherein said series of databases is at least three databases each of which has a different operating program which stores images in a different manner from the other databases.

3. A system as claimed in claim 2 including output devices designed to operate in a standard conventional manner and in a manner specifically designed to efficiently output images defined according to the predetermined standard.

4. A system as claimed in claim 3 including input devices which include an input arrangement for inputting images in at least two different manners with one manner being said predetermined standard.

5. A system as claimed in claim 1 wherein said proxy stub arrangement is designed for at least three different middlewares.

6. A system as claimed in claim 5 wherein said network is INTERNET.

7. A system as claimed in claim 6 wherein said proxy stub arrangement accommodates at least HTTP, DCOM, CORBA, and RMI.

8. A system as claimed in claim 5 wherein said network is an INTRANET network.

9. A system as claimed in claim 1 including at least one printer having a processing arrangement specifically designed to process image data provided in said predetermined image standard.

10. A system as claimed in claim 1 wherein said predetermined image standard and said predetermined control signals are JAVA based.

11. A system as claimed in claim 1 wherein said predetermined image standard and said predetermined control signals are C++based.

12. A system as claimed in claim 1 wherein said predetermined image standard and said predetermined control signals are JAVA or C++based.

13. A system as claimed in claim 1 wherein said server computer stores at least some images as a series of objects where each object can be changed to define a different image and wherein said client server provides instructions to the server computer to render a particular image by providing instructions with respect to each object.

14. A system for accessing image database servers to retrieve images, said image database servers being accessible using at least one server computer with some of said image database servers storing information using one of JPEG, TIFF, GIF, and FLASHPIX, said at least one server computer being connected to at least one client computer using a proxy stub arrangement over a network which operates using a middleware which can include HTTP, DCOM, CORBA, and RMI;

said at least one client computer operating using a program which communicates with other networked devices involved with image transfer using a predetermined image standard and control signals, each of said server computer and said image database servers using programs which comnunicate with other image transfer devices utilizing said predetermined image standard and control signals, whereby image transfer is accomplished over a network using said predetermined standard and control signals thereby allowing access and retrieval of images stored in a database without knowledge of application used to store the image in the database and wherein said predetermined image standard includes the following defined elements:

a first element to retrieve the resolution of an image associated with a stored image file, a second element to partition said image into sections, a third element to calculate a base pixel size of said image, a fourth element to define a region of said image, a fifth element to retrieve a section of said image, a sixth element to retrieve a processed section of said image, a seventh element to retrieve data compression information associated with said image and an eighth element to retrieve color information related to said image.

15. A system as claimed in claim 14 wherein said predetermined standard and control signals are JAVA based.

16. A system as claimed in claim 14 wherein said predetermined standard and control signals are C++based.

* * * * *